(12) United States Patent
Fukaya

(10) Patent No.: US 10,678,020 B2
(45) Date of Patent: Jun. 9, 2020

(54) IMAGING LENS

(71) Applicant: KANTATSU CO., LTD., Tochigi (JP)

(72) Inventor: Hisao Fukaya, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 15/953,069

(22) Filed: Apr. 13, 2018

(65) Prior Publication Data

US 2019/0086640 A1 Mar. 21, 2019

(30) Foreign Application Priority Data

Apr. 14, 2017 (JP) .................. 2017-080764

(51) Int. Cl.
*G02B 9/62* (2006.01)
*G02B 27/00* (2006.01)
*G02B 13/00* (2006.01)

(52) U.S. Cl.
CPC ........... *G02B 9/62* (2013.01); *G02B 13/0045* (2013.01); *G02B 27/0025* (2013.01)

(58) Field of Classification Search
CPC ...... G02B 9/62; G02B 13/0045; G02B 13/18; G02B 13/04; G02B 13/06; G02B 27/0025; G02B 13/00; G02B 13/0015; G02B 13/24; G02B 9/60; G02B 13/006; G02B 13/143; G02B 13/16; G02B 13/22; G02B 15/177; G02B 3/04; G02B 5/005; G02B 13/02; G02B 15/14; G02B 15/173
See application file for complete search history.

(56) References Cited

U.S. PATENT DOCUMENTS

| 4,389,099 | A | 6/1983 | Imai | |
|---|---|---|---|---|
| 9,507,126 | B2 | 11/2016 | Tang et al. | |
| 2012/0188654 | A1 | 7/2012 | Huang | |
| 2013/0070346 | A1* | 3/2013 | Hsu | G02B 9/62 359/713 |
| 2013/0235473 | A1* | 9/2013 | Chen | G02B 13/0045 359/713 |
| 2013/0342918 | A1 | 12/2013 | Kubota et al. | |
| 2014/0218582 | A1* | 8/2014 | Chen | G02B 9/62 348/335 |
| 2015/0205076 | A1* | 7/2015 | Huang | G02B 3/04 348/294 |
| 2016/0124192 | A1 | 5/2016 | Koreeda | |

(Continued)

FOREIGN PATENT DOCUMENTS

| CN | 202330843 | 7/2012 |
|---|---|---|
| CN | 202975455 | 6/2013 |

(Continued)

*Primary Examiner* — William R Alexander
*Assistant Examiner* — Sharrief I Broome
(74) *Attorney, Agent, or Firm* — Hamre, Schumann, Mueller & Larson, P.C.

(57) ABSTRACT

There is provided an imaging lens with high-resolution which realizes reducing size, the low-profileness, low F-number and small telephoto ratio.
An imaging lens comprising in order from an object side to an image side, a first lens having positive refractive power, a second lens, a third lens, a fourth lens, a fifth lens having the positive refractive power, and a sixth lens, wherein a below conditional expression is satisfied:

$0.6 < TTL/f < 1.0$ where
TTL: total track length, and
f: focal length of the overall optical system.

19 Claims, 15 Drawing Sheets

(56) References Cited

U.S. PATENT DOCUMENTS

| | | |
|---|---|---|
| 2016/0187620 A1 | 6/2016 | Huang |
| 2017/0059828 A1 | 3/2017 | Sekine et al. |
| 2017/0219802 A1 | 8/2017 | Chen et al. |
| 2017/0299846 A1 | 10/2017 | Lin et al. |
| 2018/0074294 A1 | 3/2018 | Hsueh et al. |
| 2018/0074295 A1 | 3/2018 | Lin et al. |
| 2018/0143406 A1 | 5/2018 | Wenren et al. |
| 2018/0164550 A1 | 6/2018 | Wang |
| 2018/0172954 A1 | 6/2018 | Bone et al. |
| 2018/0172955 A1 | 6/2018 | Bone et al. |
| 2018/0188505 A1 | 7/2018 | Chang et al. |
| 2019/0243093 A1 | 8/2019 | Wenren et al. |

FOREIGN PATENT DOCUMENTS

| | | |
|---|---|---|
| CN | 204790153 | 11/2015 |
| CN | 105445915 | 3/2016 |
| CN | 105807407 | 7/2016 |
| CN | 105988187 | 10/2016 |
| CN | 106324799 A | 1/2017 |
| CN | 106338815 | 1/2017 |
| CN | 106802468 | 6/2017 |
| CN | 106896471 | 6/2017 |
| CN | 106896472 | 6/2017 |
| JP | 57-22215 | 2/1982 |
| TW | 201624044 | 7/2016 |
| TW | I574040 | 3/2017 |
| TW | I588527 | 6/2017 |
| TW | I589921 | 7/2017 |
| TW | I589922 | 7/2017 |

\* cited by examiner

IMAGING LENS

The present application is based on and claims priority of Japanese patent applications No. 2017-080764 filed on Apr. 14, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in a home appliance, information terminal equipment, an automobile and public transportation. Demand of products with the camera function is more increased, and development of products will be rapidly made accordingly.

The imaging lens mounted in such equipment is required to be compact, low-profile and large in pixel so as to achieve a bright lens system and high-resolution performance. For example, the following Patent Document 1 and Patent Document 2 disclose an imaging lens composed of six lenses.

Patent Document 1 (U.S. Pat. No. 9,507,126B) discloses an imaging lens comprising in order from an object side, a first lens having a convex surface facing an object side and positive refractive power, a second lens having refractive power, a third lens having positive refractive power, a fourth lens having refractive power, a fifth lens as a double-sided aspheric lens having a concave surface facing an image side and refractive power, and a sixth lens as the double-sided aspheric lens having a concave surface facing an image side near an optical axis and the convex surface an off-axial area, and such imaging lens aims to be compact and bright, and have high performance.

Patent Document 2 (CN106324799A) discloses an imaging lens comprising in order from an object side, a first lens having a convex surface facing the object side and positive refractive power, a second lens having a negative refractive power, a third lens as a double-sided aspheric lens having refractive power, a fourth lens having the negative refractive power, a fifth lens as the double-sided aspheric lens having the refractive power, and a sixth lens as the double-sided aspheric lens having a concave surface facing the object side and the convex surface facing an image side, and such imaging lens aims to be compact and have high performance.

SUMMARY OF THE INVENTION

The imaging lens disclosed in the above Patent Document 1 aims to achieve a bright lens system, however there is a problem that a telephoto ratio, a ratio of the total track length to focal length of an overall optical system is too large.

The imaging lens disclosed in the above Patent Document 2 has F-number of 2.6 to 3.0 and it means that enough brightness for the image sensor which is increasingly large in pixel is not secured.

The present invention has been made in view of the above problems, and an object of the present invention is to provide an imaging lens with high resolution which satisfies demand of compact size, low-profileness and the low F-number, is small in telephoto ratio and properly corrects aberrations.

Regarding terms used in the present invention, a convex surface, a concave surface or plane surface of lens surfaces implies that a shape of the lens surface near an optical axis (paraxial portion), refractive power implies the refractive power near the optical axis (paraxial portion). The pole point implies an off-axial point on an aspheric surface at which a tangential plane intersects the optical axis perpendicularly. The total track length is defined as a distance along the optical axis from an object-side surface of an optical element located closest to the object side to an imaging plane, when thickness of an IR cut filter or cover glass which may be arranged between the imaging lens and the imaging plane is regarded as an air.

An imaging lens according to the present invention comprises a first lens having positive refractive power, a second lens, a third lens, a fourth lens, a fifth lens having the positive refractive power, and a sixth lens, wherein it is preferable that a below conditional expression (1) is satisfied:

$$0.6 < TTL/f < 1.0 \tag{1}$$

where
TTL: total track length, and
f: focal length of the overall optical system.

The imaging lens according to the above configuration achieves low-profileness by strengthening the positive refractive power of the first lens, and properly corrects spherical aberration, coma aberration, astigmatism, and field curvature in well balance while maintaining the low-profileness of the second lens, the third lens and the fourth lens. The fifth lens having the positive refractive power achieves further low-profileness, and the sixth lens corrects distortion while appropriately securing back focus.

The conditional expression (1) defines a telephoto ratio. When a value is below the upper limit of the conditional expression (1), the total track length can be shortened and achieving compact size is facilitated. On the other hand, when the value is above the lower limit, correction of field curvature and axial chromatic aberration is facilitated and proper optical performance can be maintained.

According to the imaging lens having the above configuration, it is preferable that the fourth lens has a concave surface facing an object side near an optical axis.

When the object-side surface of the fourth lens is made as the concave surface near the optical axis, correction of the spherical aberration, the coma aberration, the astigmatism and the field curvature is properly made.

According to the imaging lens having the above configuration, it is preferable that both surfaces of the object side and the image side of the fifth lens are convex near the optical axis.

When the both surfaces of the object side and the image side of the fifth lens are convex near the optical axis, the positive refractive power is strengthened and the low-profileness of the imaging lens is facilitated.

According to the imaging lens having the above configuration, it is preferable that a below conditional expression (2) is satisfied:

$$0.7 < |r11|/f < 2.0 \tag{2}$$

where
r11: curvature radius of the object-side surface of the sixth lens, and
f: focal length of the overall optical system.

The conditional expression (2) defines a shape of the object-side surface of the sixth lens near the optical axis. By satisfying the conditional expression (2), the imaging lens can maintain the low-profileness of the imaging lens and secure proper back focus.

According to the imaging lens having the above configuration, it is preferable that a below conditional expression (3) is satisfied:

$$10<(t3/f)\times 100<20 \quad (3)$$

where t3: distance along the optical axis from the image-side surface of the third lens to the object-side surface of the fourth lens, and f: focal length of an overall optical system.

The conditional expression (3) defines an appropriate scope of the distance along the optical axis from the image-side surface of the third lens to the object-side surface of the fourth lens. By satisfying the conditional expression (3), a total length is shortened, and light ray incident angle to the fourth lens is made appropriate and excessive occurrence of the spherical aberration, the coma aberration and the distortion is suppressed. Additionally, the correction of the aberrations at the fourth lens is facilitated.

According to the imaging lens having the above configuration, it is preferable that the image-side surface of the fourth lens is convex near the optical axis. Furthermore, it is more preferable that a below conditional expression (4) is satisfied:

$$0<r7/r8<0.4 \quad (4)$$

where r7: curvature radius of the object-side surface of the fourth lens, and r8: curvature radius of the image-side surface of the fourth lens.

The conditional expression (4) defines a shape of the fourth lens near the optical axis, and it means that the curvature radius of the image-side surface is configured to be sufficiently larger than the curvature radius of the object-side surface. When the image-side surface of the fourth lens is convex near the optical axis, the object-side surface becomes concave and the fourth lens has a meniscus shape. Therefore, by satisfying the conditional expression (4), the spherical aberration occurred at the object-side surface of the fourth lens can be corrected at the image-side surface.

According to the imaging lens having the above configuration, it is preferable that a below conditional expression (5) is satisfied:

$$1.5<|r3|/f<32.0 \quad (5)$$

where r3: curvature radius of the object-side surface of the second lens, and f: focal length of an overall optical system.

The conditional expression (5) defines a shape of the object-side surface of the second lens near the optical axis. By satisfying the conditional expression (5), the coma aberration and the astigmatism can be properly corrected.

According to the imaging lens having the above configuration, it is preferable that the sixth lens has negative refractive power. Furthermore, it is more preferable that a below conditional expression (6) is satisfied:

$$-2.0<f6/f<-1.0 \quad (6)$$

where f6: focal length of the sixth lens, and f: focal length of an overall optical system.

The conditional expression (6) defines an appropriate scope of the refractive power of the sixth lens. By satisfying the conditional expression (6), the distortion can be properly corrected and the appropriate back focus can be secured.

According to the imaging lens having the above configuration, it is preferable that a below conditional expression (7) is satisfied:

$$1.0<t3/t4<3.2 \quad (7)$$

where t3: distance along the optical axis from the image-side surface of the third lens to the object-side surface of the fourth lens, and t4: distance along the optical axis from the image-side surface of the fourth lens to the object-side surface of the fifth lens.

The conditional expression (7) defines an appropriate scope of a ratio between the distance along the optical axis from the image-side surface of the third lens to the object-side surface of the fourth lens and the distance along the optical axis from the image-side surface of the fourth lens to the object-side surface of the fifth lens. By satisfying the conditional expression (7), the fourth lens can be arranged at an appropriate position and the correction of the aberrations at the lens is facilitated.

According to the imaging lens having the above configuration, it is preferable that a below conditional expression (8) is satisfied:

$$20<vd1-vd2<50 \quad (8)$$

where vd1: abbe number at d-ray of a first lens, and vd2: abbe number at d-ray of a second lens.

The conditional expression (8) defines relationship between the abbe numbers at d-ray of the first lens and the second lens. By using materials satisfying a scope of the conditional expression (8), the chromatic aberration is properly corrected.

According to the imaging lens having the above configuration, it is preferable that a below conditional expression (9) is satisfied:

$$0.45<(EPsd\times TTL)/(ih\times f)<0.75 \quad (9)$$

where

EPsd: entrance pupil radius,

TTL: total track length,

Ih: maximum image height, and f: focal length of the overall optical system.

The conditional expression (9) defines relationship between a telephoto ratio and brightness of the imaging lens. By satisfying the conditional expression (9), an image sufficiently bright from a center to a periphery thereof can be obtained.

According to the imaging lens having the above configuration, it is preferable that a below conditional expression (10) is satisfied:

$$2.0<|r9|/f<7.0 \quad (10)$$

where r9: curvature radius of the object-side surface of the fifth lens, and f: focal length of an overall optical system.

The conditional expression (10) defines a shape of the object-side surface of the fifth lens near the optical axis. By satisfying the conditional expression (10), the astigmatism can be properly corrected. Furthermore, the low-profileness of the imaging lens can be maintained while securing the back focus.

According to the imaging lens having the above configuration, it is preferable that a below conditional expression (11) is satisfied:

$$0.2 < f1/f < 0.8 \quad (11)$$

where
f1: focal length of the first lens, and
f: focal length of the overall optical system.

The conditional expression (11) defines an appropriate scope of the refractive power of the first lens. By satisfying the conditional expression (11), the low-profileness of the imaging lens is facilitated. Furthermore, the positive refractive power of the first lens is prevented from being excessively large, and high-order spherical aberration and the coma aberration occurred at the first lens is suppressed.

According to the imaging lens having the above configuration, it is preferable that the second lens has the concave image-side surface near the optical axis and the negative refractive power. Furthermore, it is more preferable that a below conditional expression (12) is satisfied:

$$-1.5 < f2/f < -0.4 \quad (12)$$

where
f2: focal length of the first lens, and
f: focal length of the overall optical system.

The conditional expression (12) defines an appropriate scope of the refractive power of the second lens. When the image-side surface of the second lens is concave near the optical axis and the conditional expression (12) is satisfied, the spherical aberration and the chromatic aberration occurred at the first lens can be properly corrected.

According to the imaging lens having the above configuration, it is preferable that a below conditional expression (13) is satisfied:

$$0.15 < d1/f < 0.25 \quad (13)$$

where
d1: thickness on the optical axis of the first lens, and
f: focal length of the overall optical system.

The conditional expression (13) defines an appropriate scope of thickness on the optical axis of the first lens. By satisfying the conditional expression (13), the refractive power is appropriately provided, and the low-profileness of the imaging lens is facilitated. Additionally, formability of the first lens can be kept.

According to the imaging lens having the above configuration, it is preferable that the fourth lens has the negative refractive power. Furthermore, it is more preferable that a below conditional expression (14) is satisfied:

$$-1.7 < f4/f < -0.6 \quad (14)$$

where
f4: focal length of the fourth lens, and
f: focal length of the overall optical system.

The conditional expression (14) defines an appropriate scope of the refractive power of the fourth lens. By satisfying the conditional expression (14), the correction of the field curvature is facilitated.

According to the imaging lens having the above configuration, it is preferable that a below conditional expression (15) is satisfied:

$$0.15 < bf/TTL < 0.25 \quad (15)$$

where
bf: distance along the optical axis from the image-side surface of the sixth lens to an image plane (back focus), and
TTL: total track length.

The conditional expression (15) defines an appropriate scope of the back focus to the total track length. By satisfying the conditional expression (15), the sufficient low-profileness can be achieved and the appropriate back focus can be secured.

According to the imaging lens having the above configuration, it is preferable that a below conditional expression (16) is satisfied:

$$20 < vd4 - vd5 < 50 \quad (16)$$

where
vd4: abbe number at d-ray of a fourth lens, and
vd5: abbe number at d-ray of a fifth lens.

The conditional expression (16) defines relationship between the abbe numbers at d-ray of the fourth lens and the fifth lens. By using materials satisfying a scope of the conditional expression (16), the chromatic aberration is properly corrected.

According to the imaging lens having the above configuration, it is preferable that the fourth lens and the sixth lens have the negative refractive power, respectively. Furthermore, it is more preferable that a below conditional expression (17) is satisfied:

$$0.6 < f4/f6 < 1.2 \quad (17)$$

where
f4: focal length of the fourth lens, and
f6: focal length of the sixth lens.

The conditional expression (17) defines an appropriate scope of a ratio of the refractive power of the fourth lens to the refractive power of the sixth lens. By satisfying the conditional expression (17), each negative refractive power of the fourth lens and the sixth lens is appropriately distributed. Accordingly, the proper correction of the aberrations, maintaining the low-profileness, and securing the back focus are facilitated.

Effect of Invention

According to the present invention, there can be provided a compact imaging lens which achieves low-profileness, low F-number and a small telephoto ratio and has the high resolution performance.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11 and 13 are schematic views of the imaging lenses in Examples 1 to 7 according to the embodiments of the present invention, respectively. Since all figures have the same basic lens configuration, the configuration of an imaging lens according to this embodiment is explained below mainly referring to the schematic view of Example 1.

Figure 1:
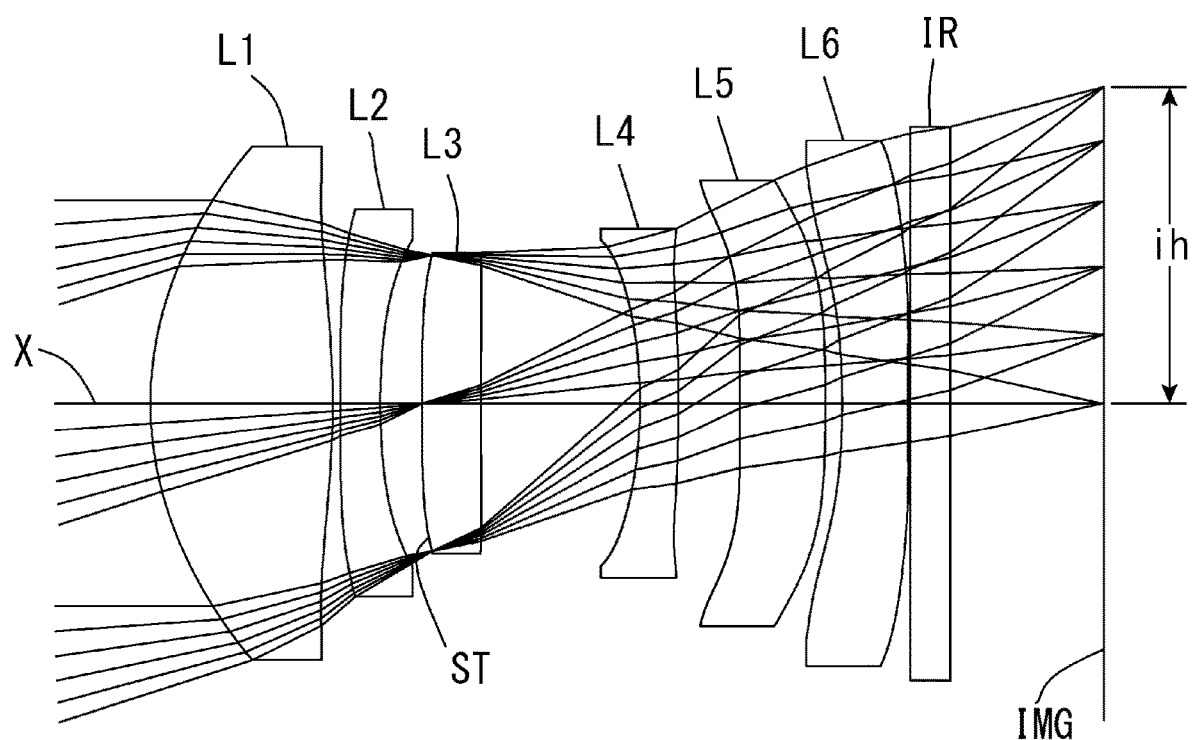
FIG. 1 is a schematic view showing a general configuration of an imaging lens in Example 1 according to the present invention.

As shown in FIG. 1, the imaging lens according to the present embodiments comprises in order from an object side to an image side, a first lens L1 having positive refractive power, a second lens L2, a third lens L3, a fourth lens L4, a fifth lens L5 having the positive refractive power, and a sixth lens L6.

A filter IR such as an IR cut filter and a cover glass is arranged between the sixth lens L6 and an image plane IMG. The filter IR is omissible.

The imaging lens according to the present embodiments comprises a front group and a rear group. The first group has positive composite refractive power and is composed of first lens L1, the second lens L2 and the third lens L3, and the rear group has negative composite refractive power and is composed of fourth lens L4, the fifth lens L5 and the sixth lens L6. Thus, the lens configuration of the imaging lens of the present embodiments is advantageous for low-profileness. All of lens surfaces are made as aspheric surface and proper correction of aberrations is made.

The first lens L1 has a convex surface facing an object side near an optical axis X and positive refractive power, and suppresses occurrence of the aberrations on the aspheric surfaces on both sides and achieves the low-profileness of the imaging lens. The first lens L1 has convex surfaces facing the object side and an image side near the optical axis X.

The second lens L2 has a concave surface facing the image side near the optical axis X and negative refractive power. The aspheric surfaces on both sides properly correct spherical aberration, coma aberration, astigmatism and chromatic aberration. When the refractive power of the second lens L2 is negative, correction effect on the chromatic aberration is obtained, therefore the present embodiment shows only an example of the negative refractive power. However, if increasing low-profileness is demanded, positive refractive power can be selected. The second lens L2 may be a meniscus lens having the concave surface facing the image side near the optical axis X or a biconcave lens having concave surface on the object side and the image side near the optical axis X. The examples 1 to 4, and 7 show examples that the second lens L2 is the meniscus lens, and the examples 5 and 6 show examples of the biconcave lens.

The third lens L3 has plane surfaces on the object side and the image sides near the optical axis X and no substantive refractive power near the optical axis X, and the aspheric surfaces on both sides corrects aberrations at a peripheral area. The Example 7 is also same configuration.

The Examples 2 to 6 are examples which the refractive power is added to the third lens L3, and the refractive power of the third lens L3 is defined as the weakest positive among the imaging lenses or the negative refractive power. The Examples 2 and 3 are the examples that the third lens L3 has the positive refractive power, and the Examples 4, 5 and 6 are the examples that the third lens L3 has the negative refractive power. All of the Examples satisfy a conditional expression (a), and the refractive power of the third lens L3 is suppressed in an appropriate scope:

$$-0.5 < f/f3 < 0.05 \qquad (a)$$

where f3: focal length of the third lens, and f: focal length of the overall optical system.

The focal length of the third lens L3 having no substantive refractive power near the optical axis becomes infinity, and the conditional expression (a) is satisfied.

As a shape of the third lens L3 near the optical axis, various options may be selected.

The Examples 2, 3 and 4 are the examples of the meniscus shape having the convex surface facing the object side near the optical axis X, the Examples 5 is the example of the meniscus shape having the concave surface facing the object side near the optical axis X, and the Example 6 is the example of biconcave lens having the concave surfaces facing the object side and the image side near the optical axis X.

The fourth lens L4 is a meniscus lens having the concave surface facing the object side near the optical axis X and the negative refractive power. The aspheric surface on the object side corrects the spherical aberration, the coma aberration and the astigmatism, and the aspheric surface on the image side corrects the spherical aberration occurred at the object-side surface. When the fourth lens L4 is the meniscus lens, the correction effect on the field curvature is obtained. When the refractive power of the fourth lens L4 is negative, the correction effect on the chromatic aberration is obtained, and therefore the present embodiment shows only an example of the negative refractive power. However, if increasing low-profileness is demanded, the positive refractive power can be selected.

Figure 15:
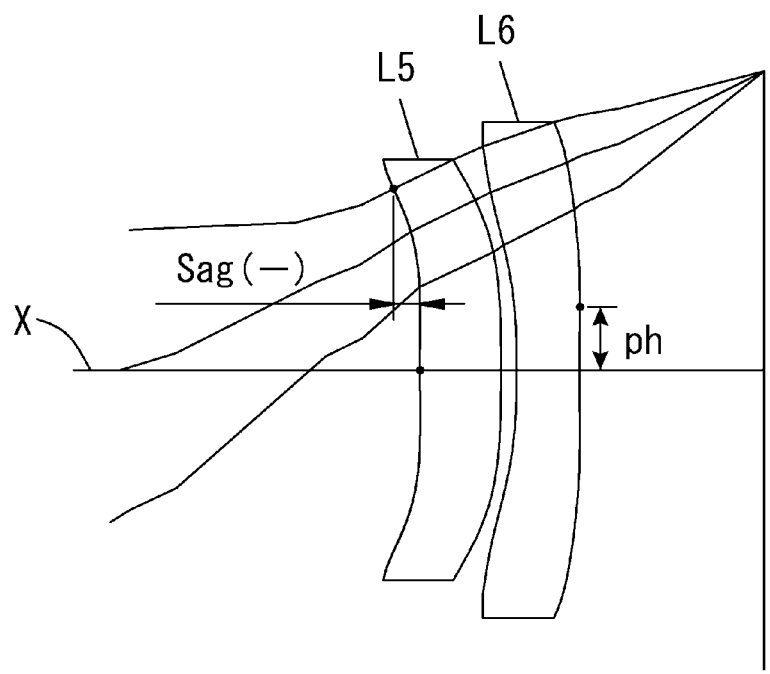
FIG. 15 is a schematic view showing height ph of a pole point on the image-side surface of the sixth lens perpendicular to the optical axis, and a shape of an aspheric surface of the fifth lens.

The fifth lens L5 has convex surfaces facing the object side and the image side near the optical axis X and the positive refractive power. By the positive refractive power near the optical axis X, the low-profileness of the imaging lens can be achieved and back focus is adjusted. The aspheric surfaces on both sides of the object side and the image side are formed so as to face the object side at a peripheral area of the lens. Specifically, as shown in FIG. 15, on the object side, sag amount of the aspheric surface at a point where light ray entering at maximum field of view passes effective diameter edge of the image-side is value in minus (point closer to the object side than an intersection of the optical axis X and the lens surface). The image side is made as the convex surface from the near the optical axis X to the peripheral area. By forming the aspheric surface, light ray emitted from the fourth lens L4 is made to enter at a small incident angle, and to emit at a small angle toward the sixth lens L6, therefore the correction of the field curvature and the distortion is facilitated.

Regarding the refractive power of the fifth lens L5, all of the Examples satisfy a conditional expression (b), and the refractive power of the fifth lens L5 is defined in an appropriate scope:

$$1.3 < f5/f < 2.5 \quad (b)$$

where
f5: focal length of the fifth lens, and
f: focal length of the overall optical system.

The sixth lens L6 has concave surfaces facing the object side and the image side near the optical axis X and the negative refractive power, and secures the back focus and corrects the distortion while maintaining the low-profileness of the imaging lens. The aspheric surfaces on both sides correct the aberrations. An image-side surface of the sixth lens L6 is the aspheric surface having a pole point, and changes to the convex surface at an area apart from the optical axis X and maintains the convex shape until an edge of an effective diameter. By applying such aspheric surface, correction of the field curvature and suppression of chief ray angle to an image plane IMG are facilitated. The sixth lens L6 secures the back focus by forming the image-side surface near the optical axis X as the concave surface. In addition, when the refractive power of the lens is negative near the optical axis X, the sufficient back focus can be secured. The present embodiment shows only an example of the negative refractive power, however, if increasing low-profileness is demanded, the positive refractive power can be selected for the sixth lens L6 and image-side surface may be concave surface near the optical axis X.

Regarding a position of the pole point formed on the image-side surface of the sixth lens L6, the imaging lens according to the present embodiments satisfies a conditional expression (c), and the desirable effect of the aspheric surface is obtained:

$$0.12 < ph/ih < 0.28 \quad (c)$$

where
ph: height perpendicular to the optical axis X, and
ih: maximum image height.

An aperture stop ST is arranged from the first lens L1 and the fourth lens L4, and a compact imaging lens and correction of the aberrations, especially the coma aberration are achieved. In the Examples 1 and 7, the aperture stop ST is formed on the object-side surface of the third lens L3, and in the Example 2, the aperture stop ST is arranged on the image-side surface of the second lens L2. In the Examples 3 to 6, the aperture stop ST is formed on the object-side surface of the second lens L2.

Regarding the imaging lens according to the present embodiments, all lenses are single lenses which are not cemented each other. In comparison with a cemented lens which cements lens surfaces, it is easy to increase the number of the aspheric surfaces and more proper correction of the aberrations can be made.

Selection of the lens surface, either a spherical surface or an aspheric surface can be made taking the performance as demanded or easiness of manufacturing into consideration.

Regarding materials of the lens to be used, in the Examples 1 to 6, a plastic material is used for all of the lenses, and in the Example 7, a glass material is used for the first lens L1, and the plastic material is used for the second lens L2 to the sixth lens L6. When the plastic material is used, manufacturing is facilitated and mass production in a low cost can be realized. According to the present invention, the first lens L1 has strong positive refractive power and therefore low-profileness is facilitated. If an environment of use is changed, influence on refractive index of the first lens L1 which changes in accordance with temperature and fact that point forming an image is moved should be considered. When use is made under high temperature or low temperature, such problem can be solved by using the glass material having low temperature dependency on the refractive index as the material for the first lens L1. The Example 7 is an example using the glass material for the first lens L1.

The imaging lens according to the present embodiments satisfies the below conditional expressions (1) to (17) and the below conditional expressions (a) to (c).

$$0.6 < TTL/f < 1.0 \quad (1)$$

$$0.7 < |r11|/f < 2.0 \quad (2)$$

$$10 < (t3/f) \times 100 < 20 \quad (3)$$

$$0 < r7/r8 < 0.4 \quad (4)$$

$$1.5 < |r3|/f < 32.0 \quad (5)$$

$$-2.0 < f6/f < -1.0 \quad (6)$$

$$1.0 < t3/t4 < 3.2 \quad (7)$$

$$20 < vd1 - vd2 < 50 \quad (8)$$

$$0.45 < (EPsd \times TTL)/(ih \times f) < 0.75 \quad (9)$$

$$2.0 < |r9|/f < 7.0 \quad (10)$$

$$0.2 < f1/f < 0.8 \quad (11)$$

$$-1.5 < f2/f < -0.4 \quad (12)$$

$$0.15 < d1/f < 0.25 \quad (13)$$

$$-1.7 < f4/f < -0.6 \quad (14)$$

$$0.15 < bf/TTL < 0.25 \quad (15)$$

$$20 < vd4 - vd5 < 50 \quad (16)$$

$$0.6 < f4/f6 < 1.2 \quad (17)$$

$$-0.5 < f/f3 < 0.05 \quad (a)$$

$$1.3 < f5/f < 2.5 \quad (b)$$

$$0.12 < ph/ih < 0.28 \quad (c)$$

where
TTL: total track length, and
f: focal length of the overall optical system,
f1: focal length of the first lens L1,
f2: focal length of the first lens L2,
f3: focal length of the third lens L3,
f4: focal length of the fourth lens L4, f5: focal length of the fifth lens L5,
f6: focal length of the sixth lens L6,
r3: curvature radius of the object-side surface of the second lens L2,
r7: curvature radius of the object-side surface of the fourth lens L4,
r8: curvature radius of the image-side surface of the fourth lens L4,
r9: curvature radius of the object-side surface of the fifth lens L5,
r11: curvature radius of the object-side surface of the sixth lens L6,
vd1: abbe number at d-ray of a first lens L1,
vd2: abbe number at d-ray of a second lens L2,
vd4: abbe number at d-ray of a fourth lens L4,
vd5: abbe number at d-ray of a fifth lens L5,
d1: thickness on the optical axis X of the first lens L1,
t3: distance along the optical axis X from the image-side surface of the third lens L3 to the object-side surface of the fourth lens L4,
t4: distance along the optical axis X from the image-side surface of the fourth lens L4 to the object-side surface of the fifth lens L5,
bf: distance along the optical axis X from the image-side surface of the sixth lens L6 to an image plane IMG,
EPsd: entrance pupil radius,
Ih: maximum image height, and
ph: height of a pole point on the image-side surface of the sixth lens L6 perpendicular to the optical axis X.

Regarding the imaging lens according to the present embodiments, it is preferable to satisfy all of conditional expressions. However, by satisfying the conditional expression individually, operational effect corresponding to each conditional expression can be obtained.

The imaging lens according to the present embodiments shows further preferable effect by satisfying the below conditional expressions (1a) to (16a).

$$0.75 < TTL/f < 1.0 \tag{1a}$$

$$0.9 < |r11|/f < 1.8 \tag{2a}$$

$$11 < (t3/f) \times 100 < 18 \tag{3a}$$

$$0 < r7/r8 < 0.27 \tag{4a}$$

$$2.3 < |r3|/f < 29.0 \tag{5a}$$

$$-1.7 < f6/f < -1.0 \tag{6a}$$

$$1.3 < t3/t4 < 3.0 \tag{7a}$$

$$30 < vd1 - vd2 < 45 \tag{8a}$$

$$0.55 < (EPsd \times TTL)/(ih \times f) < 0.70 \tag{9a}$$

$$2.2 < |r9|/f < 6.0 \tag{10a}$$

$$0.4 < f1/f < 0.8 \tag{11a}$$

$$-1.54 < k < -0.65 \tag{12a}$$

$$0.15 < d1/f < 0.23 \tag{13a}$$

$$-1.5 < f4/f < -0.8 \tag{14a}$$

$$0.15 < bf/TTL < 0.23 \tag{15a}$$

$$30 < vd4 - vd5 < 45 \tag{16a}$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{Equation 1}$$

Next, examples of the imaging lens according to this embodiment will be explained. In each example, f denotes the focal length of the overall optical system of the imaging lens, Fno denotes an F-number, w denotes a half field of view, ih denotes a maximum image height, TTL denotes a total track length, bf denotes a back focus (a filter is regarded as air), ph denotes height of a pole point on the image-side surface of the sixth lens L6 perpendicular to the optical axis X, and EPsd denotes an entrance pupil radius. Additionally, i denotes surface number counted from the object side, r denotes a curvature radius, d denotes the distance of lenses along the optical axis (surface distance), Nd denotes a refractive index at d-ray (reference wavelength), and d denotes an abbe number at d-ray. As for aspheric surfaces, an asterisk (*) is added after surface number i.

EXAMPLE 1

The basic lens data is shown below in Table 1.

TABLE 1

| Example1 |
|---|
| Unit mm |

| f = 4.95 | ih = 1.66 |
|---|---|
| Fno = 2.3 | TTL = 4.87 |
| ω(°) = 18.0 | |

| Surface Data |
|---|

| Surface Number i | Curvature Radius r | Surface Distance d | Refractive Index Nd | Abbe Number vd |
|---|---|---|---|---|
| (Object) | Infinity | Infinity | | |
| 1* | 1.7802 | 0.9461 | 1.544 | 55.86 (vd1) |

TABLE 1-continued

| Example1 | | | | |
|---|---|---|---|---|
| 2* | −4.4378 | 0.0400 | | |
| 3* | 132.2669 | 0.2070 | 1.661 | 20.37 (vd2) |
| 4* | 3.6000 | 0.2170 | | |
| 5* (Stop) | Infinity | 0.3037 | 1.535 | 55.66 |
| 6* | Infinity | 0.8258 | | |
| 7* | −3.0491 | 0.2000 | 1.544 | 55.86 (vd4) |
| 8* | −25.4216 | 0.3156 | | |
| 9* | 18.6788 | 0.4452 | 1.661 | 20.37 (vd5) |
| 10* | −10.7156 | 0.0861 | | |
| 11* | −5.4059 | 0.3444 | 1.535 | 55.66 |
| 12* | 10.4162 | 0.0101 | | |
| 13 | Infinity | 0.2100 | 1.517 | 64.17 |
| 14 | Infinity | 0.7883 | | |
| Image Plane | Infinity | | | |

Constituent Lens Data

| Lens | Start Surface | Focal Length | |
|---|---|---|---|
| 1 | 1 | 2.47 | bf = 0.94 |
| 2 | 3 | −5.60 | |
| 3 | 5 | Infinity | ph = 0.35 |
| 4 | 7 | −6.39 | |
| 5 | 9 | 10.37 | EPsd = 1.06 |
| 6 | 11 | −6.60 | |

Aspheric Surface Data

| | First Surface | Second Surface | Third Surface | Fourth Surface | Fifth Surface | Sixth Surface |
|---|---|---|---|---|---|---|
| k | −1.660269E+00 | −1.191489E+01 | 0.000000E+00 | −3.259898E+00 | 0.000000E+00 | 0.000000E+00 |
| A4 | 2.469511E−02 | 4.071218E−02 | 4.833220E−02 | 7.758519E−02 | 1.213871E−01 | 7.591957E−03 |
| A6 | −2.048790E−03 | 2.749852E−02 | 9.043305E−02 | 1.149770E−01 | 7.901393E−02 | 3.698995E−02 |
| A8 | −5.223881E−03 | −5.184218E−02 | −3.324224E−02 | 8.029382E−02 | −6.251477E−04 | −9.985825E−02 |
| A10 | 6.233252E−03 | 2.015429E−02 | −1.853423E−01 | −2.760855E−01 | −1.546872E−01 | 2.330313E−02 |
| A12 | −3.154700E−03 | 1.451411E−02 | 2.348367E−01 | −8.066624E−02 | 6.819540E−02 | −3.674210E−02 |
| A14 | 6.571396E−04 | −1.343663E−02 | −9.393110E−02 | 3.979531E−01 | 0.000000E+00 | 0.000000E+00 |
| A16 | 2.701078E−05 | 3.178197E−03 | 1.003331E−02 | −1.645744E−01 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 8.641597E+00 | 9.899756E+01 | 0.000000E+00 | 7.114994E+01 | 8.042867E+00 | 4.566465E+01 |
| A4 | −2.237762E−01 | −2.778630E−01 | −1.589417E−01 | −7.262471E−02 | −2.368421E−01 | −2.547951E−01 |
| A6 | 5.053168E−01 | 5.307494E−01 | −3.055324E−01 | −2.569834E−01 | 3.005668E−01 | 3.010466E−01 |
| A8 | −2.231782E−01 | 9.895047E−02 | 7.985743E−01 | 4.225867E−01 | −1.447787E−01 | −2.104653E−01 |
| A10 | −3.813308E−01 | −6.893191E−02 | −9.772045E−01 | −3.151506E−01 | 4.210511E−02 | 7.707323E−02 |
| A12 | 1.329591E−01 | 3.538492E−01 | 6.158385E−01 | 1.230874E−01 | −8.184242E−03 | −1.245526E−02 |
| A14 | 0.000000E+00 | 0.000000E+00 | −1.462924E−01 | −1.780764E−02 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 1 satisfies conditional expressions (1) to (17), and (a) to (c) as shown in Table 8.

Figure 2:
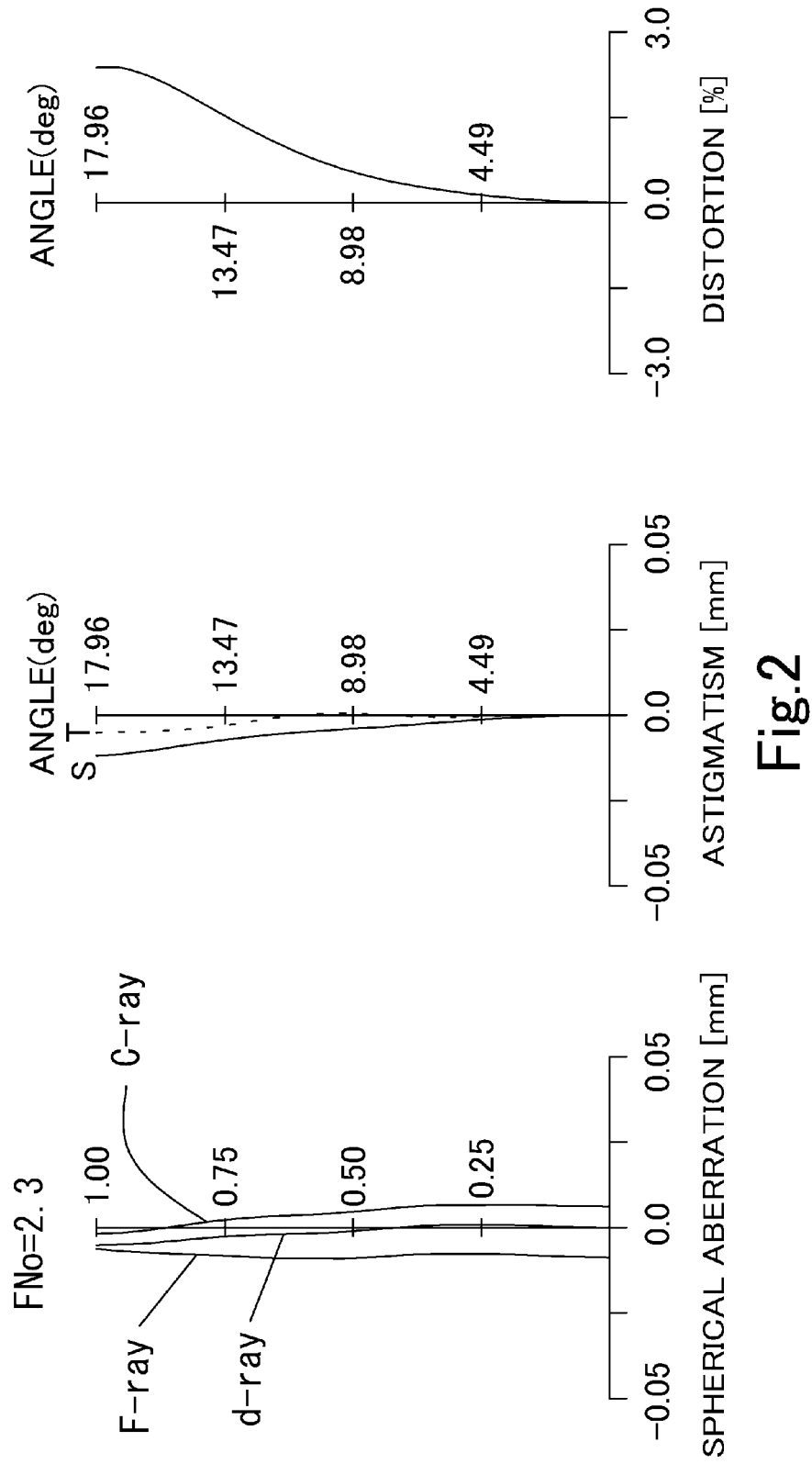
FIG. 2 shows spherical aberration, astigmatism, and distortion of the imaging lens in Example 1 according to the present invention.
Figure 3:
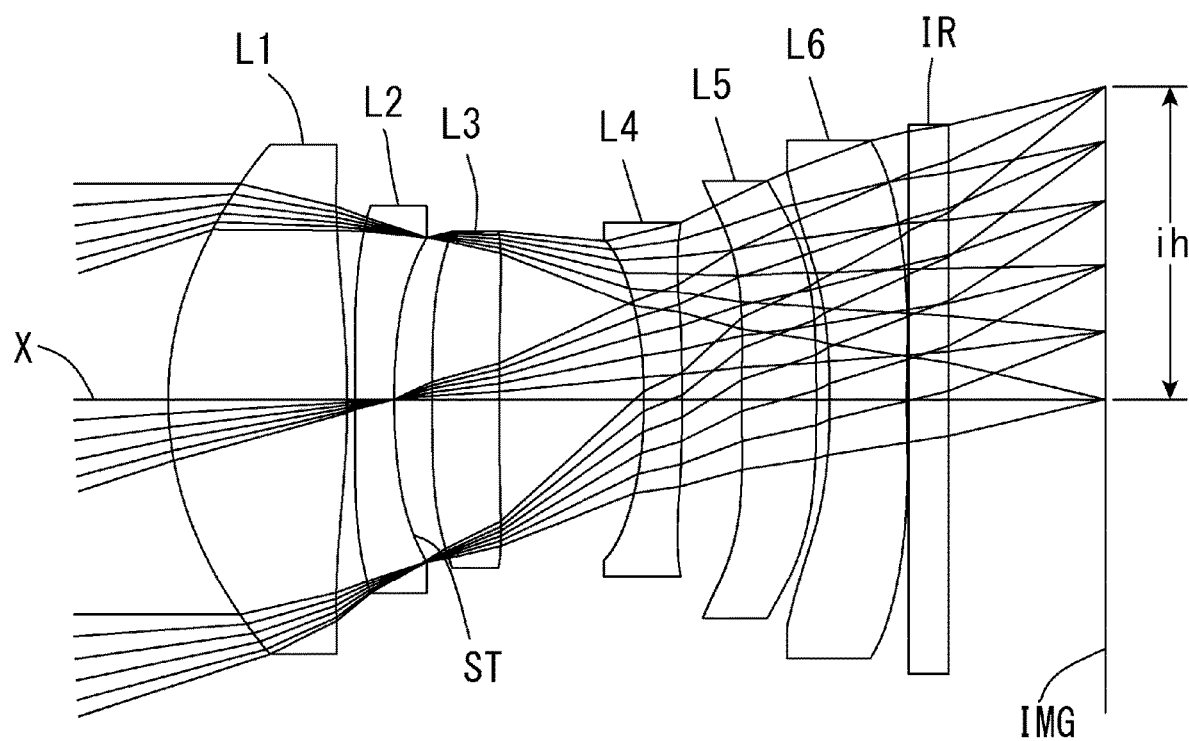
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T, respectively (same as FIGS. 4, 6, 8, 10, 12 and 14). As shown in FIG. 2, each aberration is corrected excellently.

EXAMPLE 2

The basic lens data is shown below in Table 2.

TABLE 2

| Example2 |
| --- |
| Unit mm |

| f = 4.95 | ih = 1.66 |
| --- | --- |
| Fno = 2.3 | TTL = 4.87 |
| ω(°) = 18.0 | |

Surface Data

| Surface Number i | Curvature Radius r | Surface Distance d | Refractive Index Nd | Abbe Number νd |
| --- | --- | --- | --- | --- |
| (Object) | Infinity | Infinity | | |
| 1* | 1.7664 | 0.9459 | 1.544 | 55.86 (vd1) |
| 2* | −4.6298 | 0.0400 | | |
| 3* | 132.2669 | 0.2070 | 1.661 | 20.37 (vd2) |
| 4* (Stop) | 3.6000 | 0.2000 | | |
| 5* | 19.4016 | 0.3530 | 1.535 | 55.66 |
| 6* | 23.1966 | 0.7661 | | |
| 7* | −3.0188 | 0.2000 | 1.544 | 55.86 (vd4) |
| 8* | −36.0751 | 0.3146 | | |
| 9* | 14.7226 | 0.3929 | 1.661 | 20.37 (vd5) |
| 10* | −10.5841 | 0.0700 | | |
| 11* | −5.1637 | 0.4092 | 1.535 | 55.66 |
| 12* | 10.3467 | 0.0101 | | |
| 13 | Infinity | 0.2100 | 1.517 | 64.17 |
| 14 | Infinity | 0.8201 | | |
| Image Plane | Infinity | | | |

Constituent Lens Data

| Lens | Start Surface | Focal Length | |
| --- | --- | --- | --- |
| 1 | 1 | 2.48 | bf = 0.97 |
| 2 | 3 | −5.60 | |
| 3 | 5 | 214.78 | ph = 0.36 |
| 4 | 7 | −6.07 | |
| 5 | 9 | 9.38 | EPsd = 1.06 |
| 6 | 11 | −6.38 | |

Aspheric Surface Data

| | First Surface | Second Surface | Third Surface | Fourth Surface | Fifth Surface | Sixth Surface |
| --- | --- | --- | --- | --- | --- | --- |
| k | −1.673981E+00 | −1.039706E+01 | 0.000000E+00 | −2.255780E+00 | 0.000000E+00 | 0.000000E+00 |
| A4 | 2.561807E−02 | 2.100059E−02 | 2.009929E−02 | 6.863143E−02 | 1.223477E−01 | 1.630633E−03 |
| A6 | −1.798525E−03 | 1.189120E−01 | 2.263826E−01 | 1.882090E−01 | 7.878561E−02 | 2.712095E−02 |
| A8 | −6.323963E−03 | −2.627246E−01 | −3.683437E−01 | −1.136512E−01 | −8.610870E−04 | −9.324054E−02 |
| A10 | 6.421201E−03 | 3.008003E−01 | 2.936270E−01 | −4.112625E−02 | −1.525601E−01 | 3.272471E−02 |
| A12 | −2.861167E−03 | −2.004013E−01 | −1.347599E−01 | −7.526646E−02 | 7.357719E−02 | −3.949350E−02 |
| A14 | 3.635463E−04 | 7.354396E−02 | 3.584522E−02 | 1.138011E−01 | 0.000000E+00 | 0.000000E+00 |
| A16 | 1.111327E−04 | −1.113663E−02 | −1.891729E−03 | 1.217154E−02 | 0.000000E+00 | 0.000000E+00 |

| | Seventh Surface | Eighth Surface | Ninth Surface | Tenth Surface | Eleventh Surface | Twelfth Surface |
| --- | --- | --- | --- | --- | --- | --- |
| k | 9.445614E+00 | 9.899756E+01 | 0.000000E+00 | 7.029153E+01 | 8.042867E+00 | 4.566465E+01 |
| A4 | −2.453887E−01 | −3.089982E−01 | −1.509476E−01 | −5.823641E−02 | −2.144608E−01 | −2.314762E−01 |
| A6 | 5.011643E−01 | 5.698387E−01 | −2.994024E−01 | −3.057344E−01 | 1.610133E−01 | 2.232291E−01 |
| A8 | −1.955123E−01 | −3.152821E−02 | 7.929772E−01 | 5.116703E−01 | 2.495302E−02 | −1.475843E−01 |
| A10 | −3.622205E−01 | −4.384057E−01 | −9.766976E−01 | −3.924727E−01 | −4.645761E−02 | 5.309660E−02 |
| A12 | 1.446153E−01 | 2.195515E−01 | 6.151242E−01 | 1.538842E−01 | 9.289631E−03 | −8.808473E−03 |
| A14 | 0.000000E+00 | 0.000000E+00 | −1.493452E−01 | −2.217860E−02 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 2 satisfies conditional expressions (1) to (17), and (a) to (c) as shown in Table 8.

Figure 4:
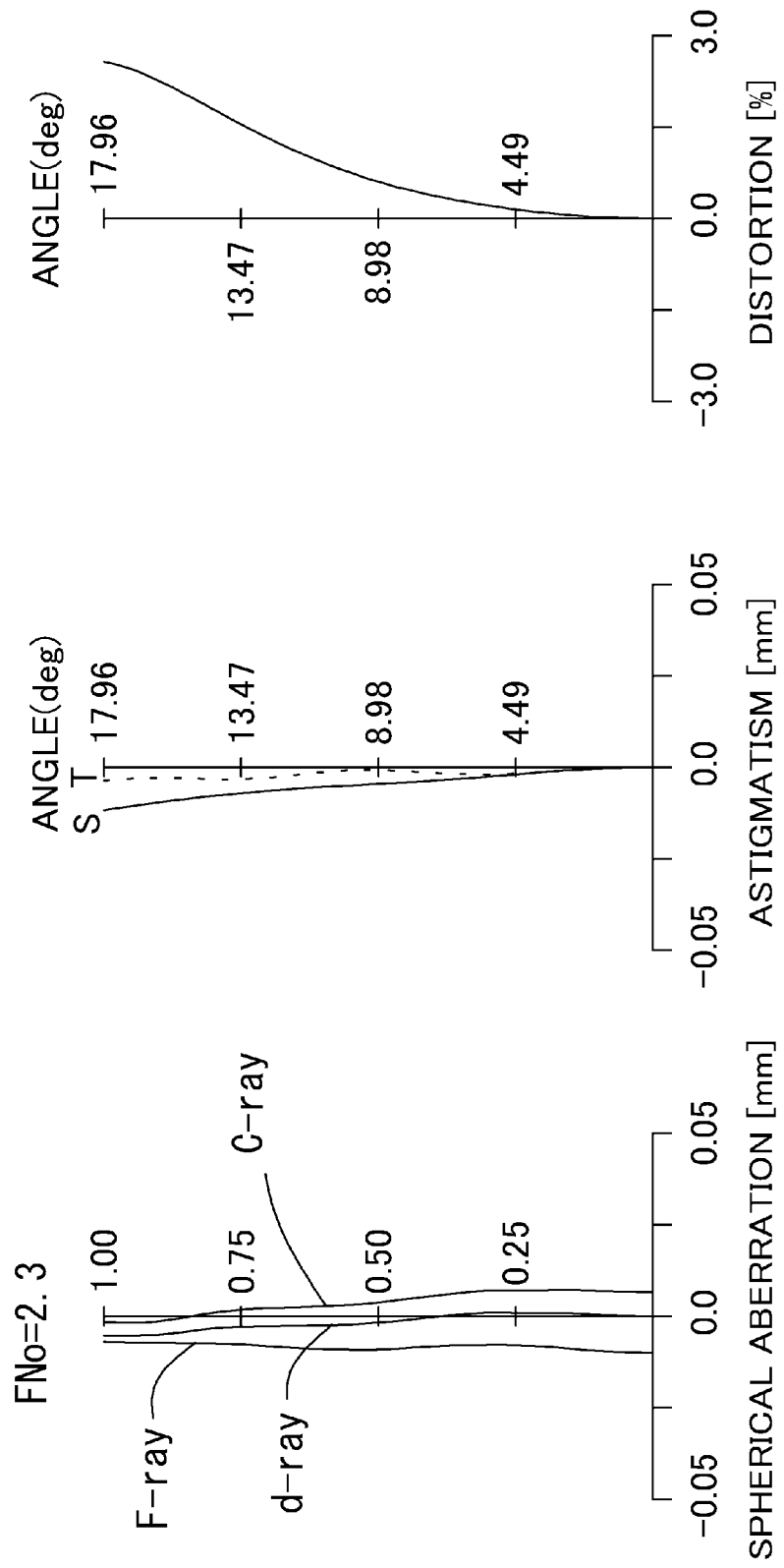
FIG. 4 shows spherical aberration, astigmatism, and distortion of the imaging lens in Example 2 according to the present invention.
Figure 5:
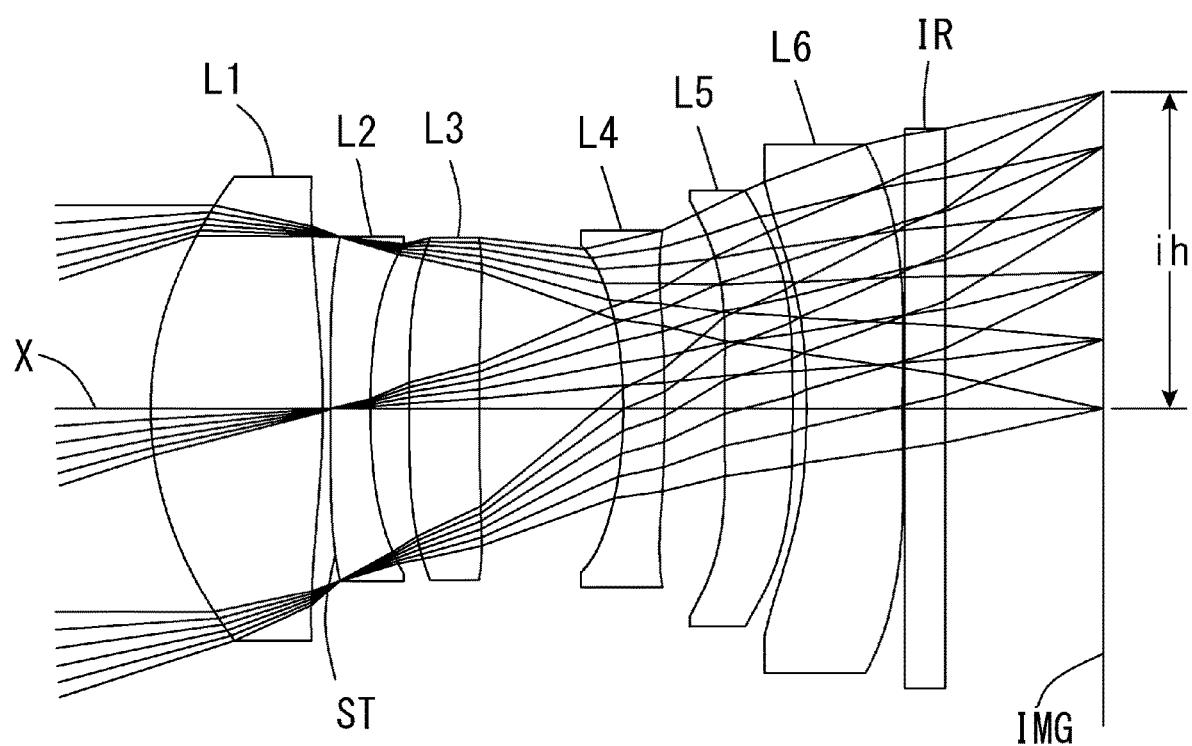
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

EXAMPLE 3

The basic lens data is shown below in Table 3.

TABLE 3

Example3

Unit mm f = 4.95
Fno = 2.3
ω(°) = 18.0
ih = 1.66
TTL = 4.87

Surface Data

| Surface Number i | Curvature Radius r | Surface Distance d | Refractive Index Nd | Abbe Number vd |
|---|---|---|---|---|
| (Object) | Infinity | Infinity | | |
| 1* | 1.7482 | 0.8942 | 1.544 | 55.86 (vd1) |
| 2* | −4.5726 | 0.0400 | | |
| 3* (Stop) | 132.2669 | 0.2070 | 1.661 | 20.37 (vd2) |
| 4* | 3.6000 | 0.2000 | | |
| 5* | 18.1383 | 0.3642 | 1.535 | 55.66 |
| 6* | 18.0502 | 0.7476 | | |
| 7* | −2.9980 | 0.2130 | 1.544 | 55.86 (vd4) |
| 8* | −39.1973 | 0.3124 | | |
| 9* | 13.8817 | 0.3539 | 1.661 | 20.37 (vd5) |
| 10* | −10.5054 | 0.0700 | | |
| 11* | −5.1320 | 0.5021 | 1.535 | 55.66 |
| 12* | 10.4830 | 0.0101 | | |
| 13 | Infinity | 0.2100 | 1.517 | 64.17 |
| 14 | Infinity | 0.8137 | | |
| Image Plane | Infinity | | | |

Constituent Lens Data

| Lens | Start Surface | Focal Length | |
|---|---|---|---|
| 1 | 1 | 2.45 | bf = 0.96 |
| 2 | 3 | −5.60 | |
| 3 | 5 | 15772.98 | ph = 0.38 |
| 4 | 7 | −5.98 | |
| 5 | 9 | 9.10 | EPsd = 1.06 |
| 6 | 11 | −6.37 | |

Aspheric Surface Data

| | First Surface | Second Surface | Third Surface | Fourth Surface | Fifth Surface | Sixth Surface |
|---|---|---|---|---|---|---|
| k | −1.658170E−00 | −1.046659E+01 | 0.000000E+00 | −2.358967E+00 | 0.000000E+00 | 0.000000E−00 |
| A4 | 2.621230E−02 | 1.270284E−02 | 1.195607E−01 | 6.743211E−02 | 1.214149E−01 | −8.820284E−04 |
| A6 | −1.860909E−03 | 1.488725E−01 | 2.272704E−01 | 1.453684E−01 | 7.793503E−02 | 2.400965E−02 |
| A8 | −9.541409E−03 | −3.055830E−01 | −2.410696E−01 | 1.829561E−01 | −5.909296E−04 | −9.379072E−02 |
| A10 | 1.429125E−02 | 3.304381E−01 | −1.082214E−01 | −9.230553E−01 | −1.504283E−01 | 3.142787E−02 |
| A12 | −1.151462E−02 | −2.057247E−01 | 4.451042E−01 | 1.340656E+00 | 7.647410E−02 | −3.799053E−02 |
| A14 | 5.121610E−03 | 6.893918E−02 | −3.833937E−01 | −1.069235E+00 | 0.000000E+00 | 0.000000E−00 |
| A16 | −9.209958E−04 | −9.304175E−03 | 1.199775E−01 | 4.166469E−01 | 0.000000E+00 | 0.000000E−00 |

| | Seventh Surface | Eighth Surface | Ninth Surface | Tenth Surface | Eleventh Surface | Twelfth Surface |
|---|---|---|---|---|---|---|
| k | 9.673547E−00 | 9.899756E+01 | 0.000000E+00 | 7.137419E+01 | 8.042867E+00 | 4.566465E−01 |
| A4 | −2.502225E−01 | −3.163239E−01 | −1.530626E−01 | −5.853174E−02 | −1.911985E−01 | −2.017960E−01 |
| A6 | 4.990274E−01 | 5.705373E−01 | −2.999588E−01 | −2.994899E−01 | 1.308913E−01 | 1.666859E−01 |
| A8 | −1.924435E−01 | −3.488634E−02 | 7.921745E−01 | 5.170956E−01 | 4.024057E−02 | −1.025963E−01 |
| A10 | −3.549282E−01 | −4.123792E−01 | −9.765142E−01 | −4.199935E−01 | −5.110691E−02 | 3.504971E−02 |
| A12 | 1.436517E−01 | 2.004521E−01 | 6.146528E−01 | 1.756842E−01 | 1.033988E−02 | −5.775045E−03 |
| A14 | 0.000000E−00 | 0.000000E+00 | −1.506038E−01 | −2.698906E−02 | 0.000000E+00 | 0.000000E−00 |
| A16 | 0.000000E−00 | 0.000000E+00 | 0.000000E+00 | 0.000000E+00 | 0.000000E+00 | 0.000000E−00 |

The imaging lens in Example 3 satisfies conditional expressions (1) to (17), and (a) to (c) as shown in Table 8.

Figure 6:
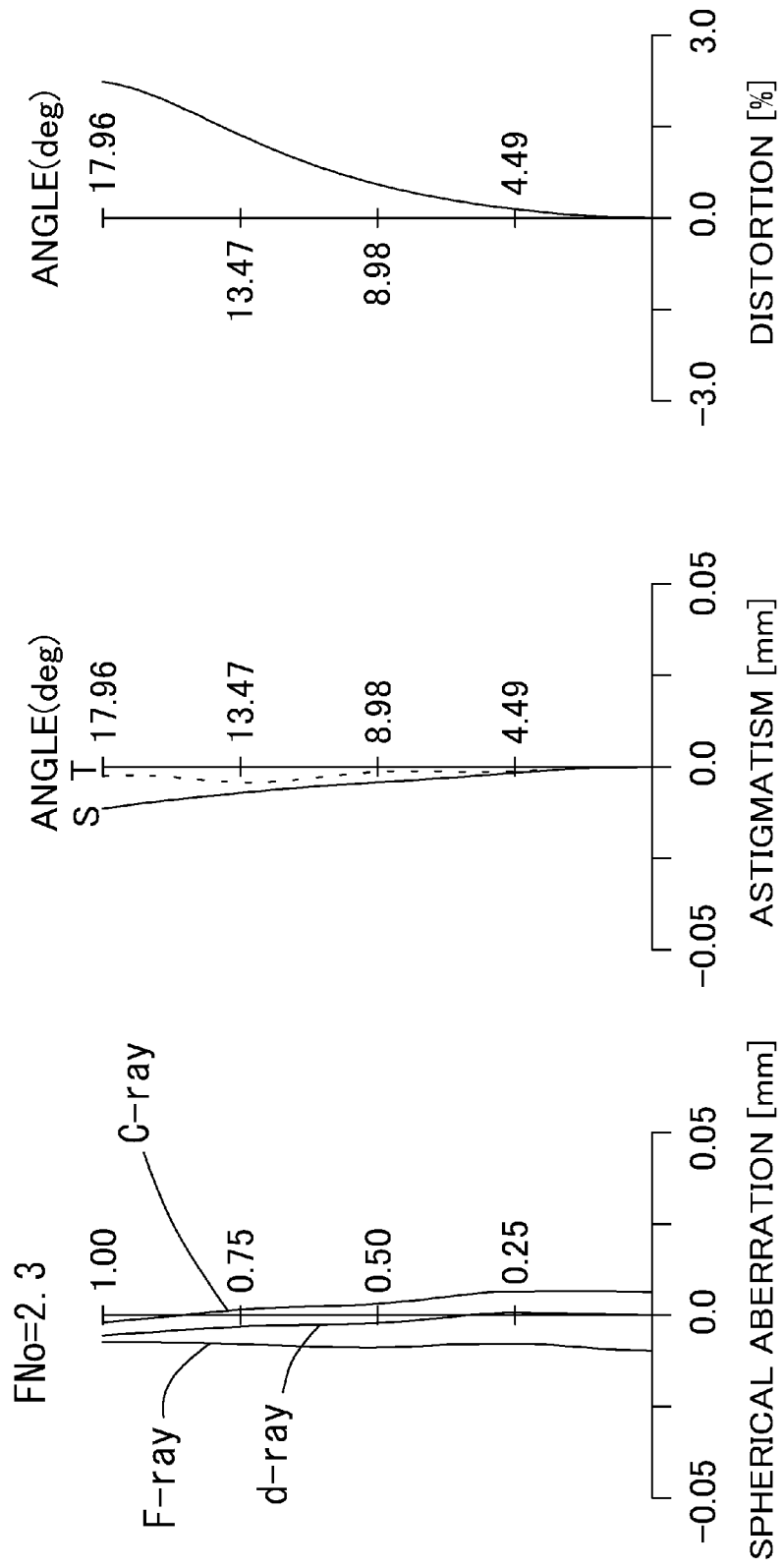
FIG. 6 shows spherical aberration, astigmatism, and distortion of the imaging lens in Example 3 according to the present invention.
Figure 7:
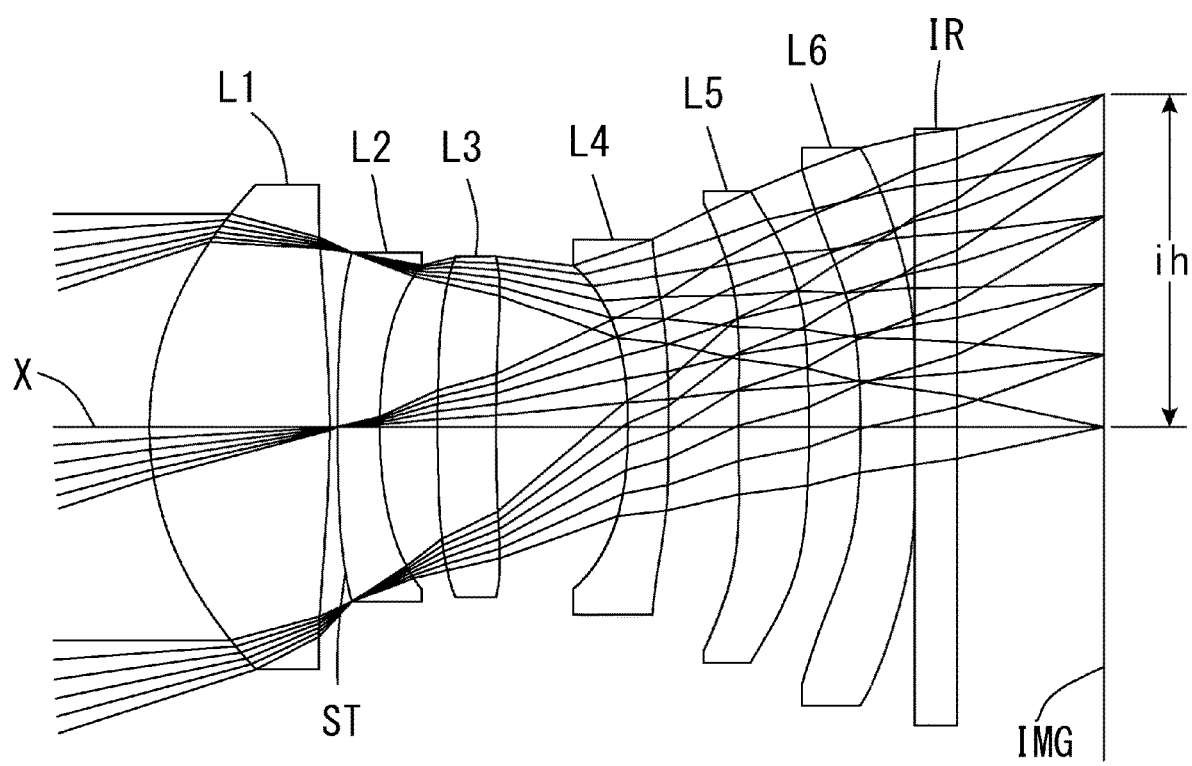
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

EXAMPLE 4

The basic lens data is shown below in Table 4.

TABLE 4

Example4

Unit mm $f = 4.96$  $ih = 1.66$
$Fno = 2.3$  $TTL = 4.64$
$\omega(°) = 18.0$

Surface Data

| Surface Number i | Curvature Radius r | Surface Distance d | Refractive Index Nd | Abbe Number vd |
|---|---|---|---|---|
| (Object) | Infinity | Infinity | | |
| 1* | 1.5026 | 0.8904 | 1.544 | 55.86 (vd1) |
| 2* | −5.9651 | 0.0400 | | |
| 3* (Stop) | 13.1676 | 0.2070 | 1.661 | 20.37 (vd2) |
| 4* | 2.4683 | 0.2851 | | |
| 5* | 13.7260 | 0.2871 | 1.535 | 55.66 |
| 6* | 7.8046 | 0.6531 | | |
| 7* | −2.8775 | 0.2000 | 1.544 | 55.86 (vd4) |
| 8* | −180.0000 | 0.3454 | | |
| 9* | 13.7361 | 0.3461 | 1.661 | 20.37 (vd5) |
| 10* | −8.9841 | 0.2541 | | |
| 11* | −6.9943 | 0.2700 | 1.535 | 55.66 |
| 12* | 10.4720 | 0.3000 | | |
| 13 | Infinity | 0.2100 | 1.517 | 64.17 |
| 14 | Infinity | 0.4224 | | |
| Image Plane | Infinity | | | |

Constituent Lens Data

| Lens | Start Surface | Focal Length | |
|---|---|---|---|
| 1 | 1 | 2.30 | bf = 0.86 |
| 2 | 3 | −4.63 | |
| 3 | 5 | −34.41 | ph = 0.28 |
| 4 | 7 | −5.37 | |
| 5 | 9 | 8.27 | EPsd = 1.06 |
| 6 | 11 | −7.80 | |

Aspheric Surface Data

| | First Surface | Second Surface | Third Surface | Fourth Surface | Fifth Surface | Sixth Surface |
|---|---|---|---|---|---|---|
| k | −1.243291E+00 | −3.981458E−01 | 0.000000E+00 | 1.893028E+00 | 0.000000E+00 | 0.000000E+00 |
| A4 | 3.345436E−02 | 4.519470E−03 | 2.031833E−02 | 8.205959E−02 | 9.591659E−02 | −3.369562E−02 |
| A6 | 5.136438E−03 | 1.783724E−01 | 2.461385E−01 | 1.603189E−01 | 4.557770E−02 | 3.448572E−03 |
| A8 | −1.703369E−02 | −4.465511E−01 | −4.871715E−01 | −1.239849E−01 | 1.255128E−02 | −1.036999E−01 |
| A10 | 2.449009E−02 | 6.080996E−01 | 4.931178E−01 | 3.160078E−02 | −1.049472E−01 | 9.011875E−03 |
| A12 | −2.138486E−02 | −4.932983E−01 | −2.171690E−01 | 1.811286E−01 | 9.766178E−02 | −3.488560E−02 |
| A14 | 8.283905E−03 | 2.247687E−01 | −7.276611E−03 | −2.992564E−01 | 0.000000E+00 | 0.000000E+00 |
| A16 | −9.368945E−04 | −4.398784E−02 | 2.936294E−02 | 2.716118E−01 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 9.437693E+00 | 9.899756E+01 | 0.000000E+00 | 4.629869E+01 | 8.042867E+00 | 4.566465E+01 |
| A4 | −4.696156E−01 | −4.755401E−01 | −1.331935E−01 | −5.744238E−02 | −3.112047E−01 | −3.412887E−01 |
| A6 | 5.097430E−01 | 6.197621E−01 | −3.399897E−01 | −3.004777E−01 | 2.051553E−01 | 2.819516E−01 |
| A8 | −1.886331E−01 | −1.257407E−01 | 8.014409E−01 | 4.839850E−01 | 3.179146E−02 | −1.306701E−01 |
| A10 | −1.342362E−01 | −1.654253E−01 | −9.405330E−01 | −3.990654E−01 | −6.246174E−02 | 3.287107E−02 |
| A12 | −2.091269E−01 | 5.867473E−02 | 6.207794E−01 | 1.894554E−01 | 1.441722E−01 | −4.486801E−03 |
| A14 | 0.000000E+00 | 0.000000E+00 | −1.689167E−01 | −3.687053E−02 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 4 satisfies conditional expressions (1) to (17), and (a) to (c) as shown in Table 8.

Figure 8:
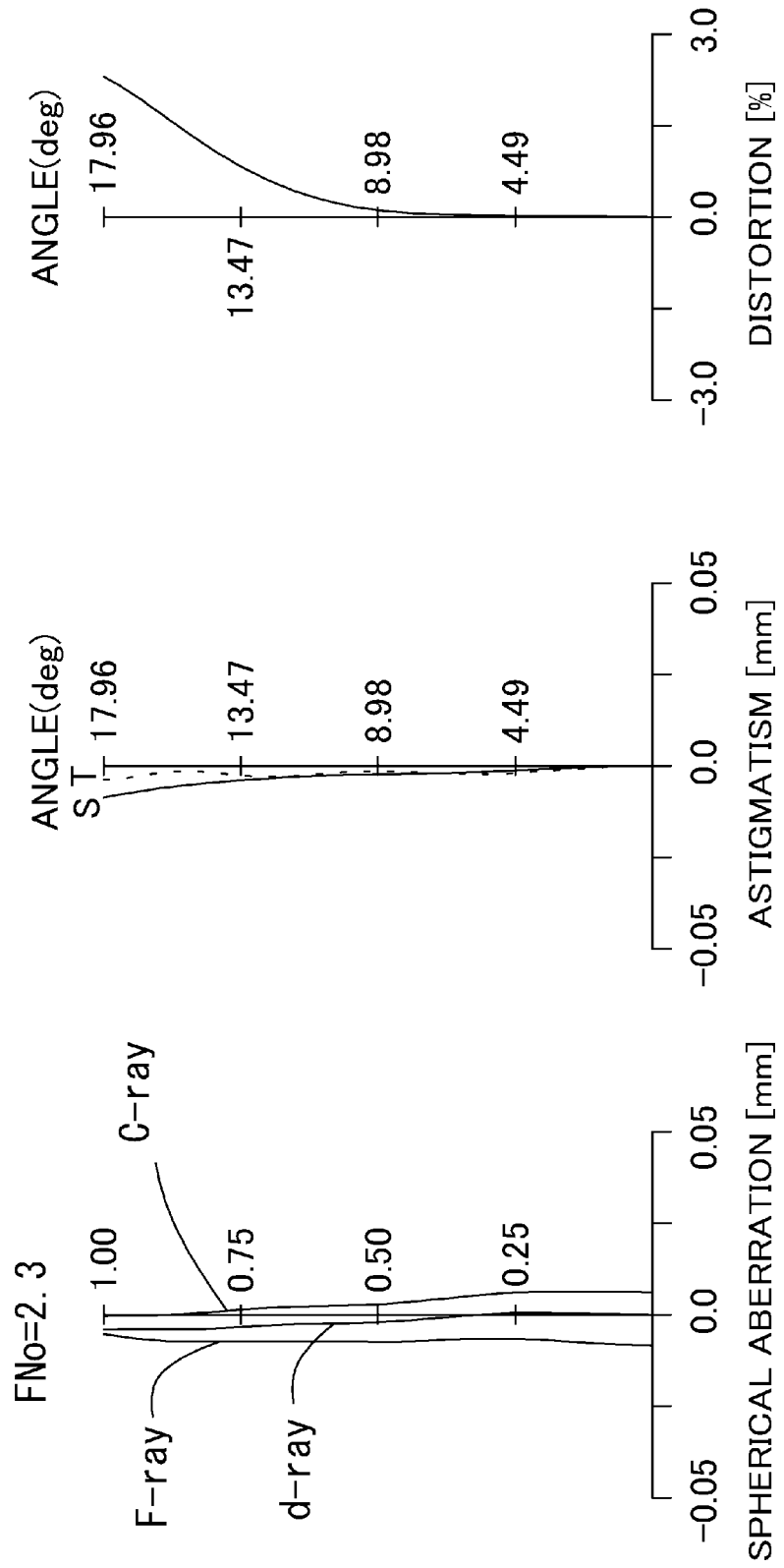
FIG. 8 shows spherical aberration, astigmatism, and distortion of the imaging lens in Example 4 according to the present invention.
Figure 9:
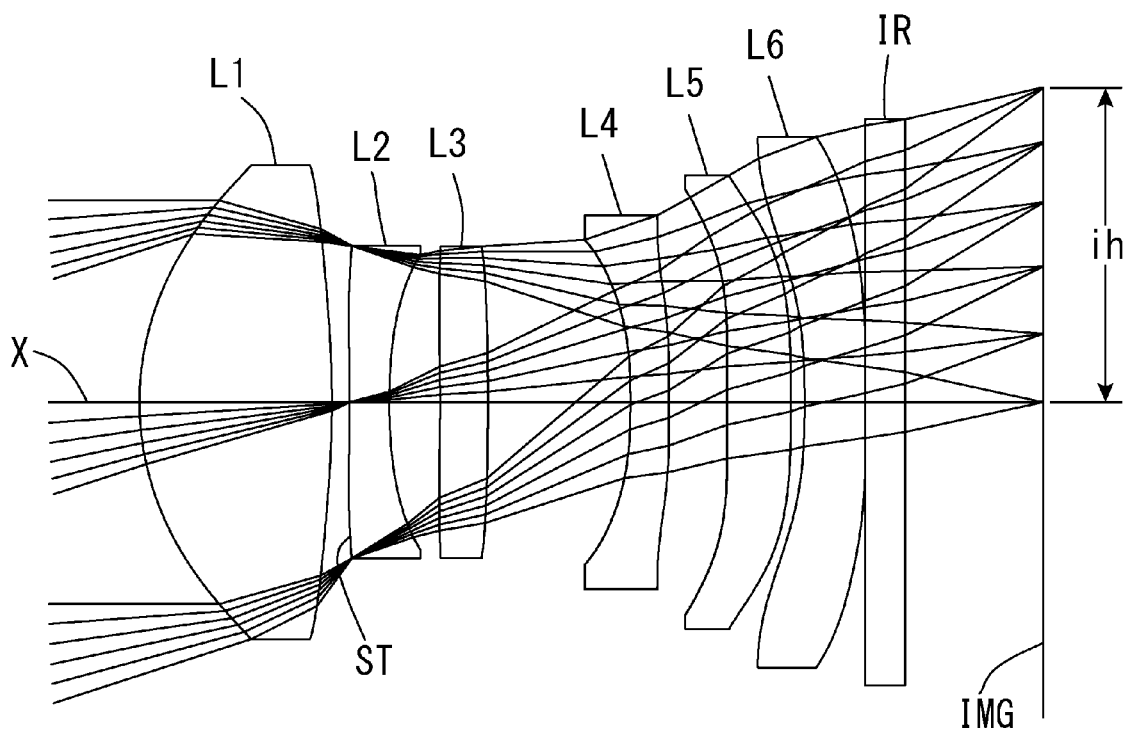
FIG. 9 is a schematic view showing a general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

EXAMPLE 5

The basic lens data is shown below in Table 5.

TABLE 5

Example5

Unit mm f = 4.95　　　　　　　　　ih = 1.66
Fno = 2.3　　　　　　　　　TTL = 4.64
ω(°) = 18.0

Surface Data

| Surface Number i | Curvature Radius r | Surface Distance d | Refractive Index Nd | Abbe Number νd |
|---|---|---|---|---|
| (Object) | Infinity | Infinity | | |
| 1* | 1.4791 | 1.0054 | 1.544 | 55.86 (vd1) |
| 2* | −5.2983 | 0.0927 | | |
| 3* (Stop) | −18.2778 | 0.2070 | 1.661 | 20.37 (vd2) |
| 4* | 2.9094 | 0.2657 | | |
| 5* | −12.4692 | 0.2500 | 1.661 | 20.37 |
| 6* | −14.3329 | 0.7456 | | |
| 7* | −3.3439 | 0.2000 | 1.544 | 55.86 (vd4) |
| 8* | −180.0000 | 0.3031 | | |
| 9* | 26.4563 | 0.3352 | 1.661 | 20.37 (vd5) |
| 10* | −8.8020 | 0.0700 | | |
| 11* | −6.4244 | 0.3134 | 1.535 | 55.66 |
| 12* | 10.3528 | 0.3000 | | |
| 13 | Infinity | 0.2100 | 1.517 | 64.17 |
| 14 | Infinity | 0.4183 | | |
| Image Plane | Infinity | | | |

Constituent Lens Data

| Lens | Start Surface | Focal Length | |
|---|---|---|---|
| 1 | 1 | 2.24 | bf = 0.86 |
| 2 | 3 | −3.78 | |
| 3 | 5 | −153.31 | ph = 0.28 |
| 4 | 7 | −6.26 | |
| 5 | 9 | 10.03 | EPsd = 1.05 |
| 6 | 11 | −7.36 | |

Aspheric Surface Data

| | First Surface | Second Surface | Third Surface | Fourth Surface | Fifth Surface | Sixth Surface |
|---|---|---|---|---|---|---|
| k | −1.111225E+00 | 2.086958E+00 | 0.000000E+00 | 1.763200E+00 | 0.000000E−00 | 0.000000E+00 |
| A4 | 3.286340E−02 | 2.442899E−02 | 4.175104E−02 | 9.113837E−02 | 7.199941E−02 | −3.966212E−04 |
| A6 | 8.942227E−03 | 7.899165E−02 | 1.533480E−01 | 2.021856E−01 | 3.142971E−02 | 1.607501E−02 |
| A8 | −1.313532E−02 | −2.088425E−01 | −2.615360E−01 | −3.241485E−01 | −7.123846E−03 | −9.007016E−02 |
| A10 | 1.956592E−02 | 2.667493E−01 | −1.506498E−01 | 2.873520E−01 | −1.273604E−01 | 2.857997E−02 |
| A12 | −1.903804E−02 | −2.040631E−01 | 1.023260E+00 | 3.537278E−01 | 7.865593E−02 | −1.082376E−02 |
| A14 | 9.796388E−03 | 8.579791E−02 | −1.285722E+00 | −1.209249E+00 | 0.000000E+00 | 0.000000E+00 |
| A16 | −2.522822E−03 | −1.534673E−02 | 5.571249E−01 | 9.229111E−01 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 6.468097E+00 | 9.899756E+01 | 0.000000E+00 | 4.616474E+01 | 8.042867E+00 | 4.524279E+01 |
| A4 | −4.316073E−01 | −4.466089E−01 | −1.352393E−01 | −8.835633E−02 | −3.746254E−01 | −3.541534E−01 |
| A6 | 5.041460E−01 | 6.093588E−01 | −3.437234E−01 | −2.287806E−01 | 4.629353E−01 | 3.915224E−01 |
| A8 | −1.918754E−01 | −8.413340E−02 | 7.968620E−01 | 3.351658E−01 | −2.540986E−01 | −2.490896E−01 |
| A10 | −1.256212E−01 | −2.020811E−01 | −9.441483E−01 | −2.250045E−01 | 7.466790E−02 | 7.962751E−02 |
| A12 | −3.591276E−02 | 6.612772E−02 | 6.207939E−01 | 8.103130E−02 | −9.281030E−03 | −1.078389E−02 |
| A14 | 0.000000E+00 | 0.000000E+00 | −1.669251E−01 | −8.957964E−03 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 5 satisfies conditional expressions (1) to (17), and (a) to (c) as shown in Table 8.

Figure 10:
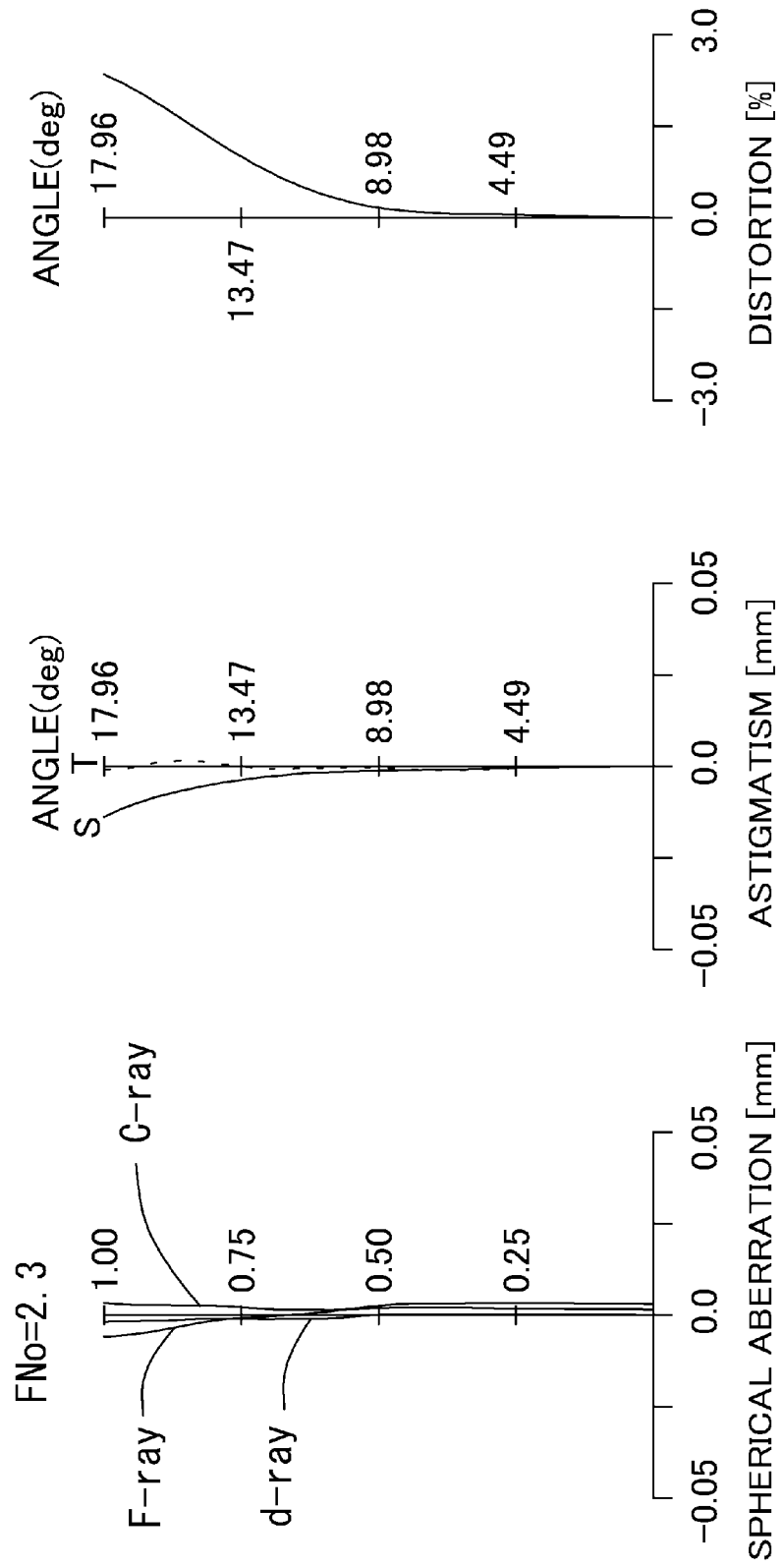
FIG. 10 shows spherical aberration, astigmatism, and distortion of the imaging lens in Example 5 according to the present invention.
Figure 11:
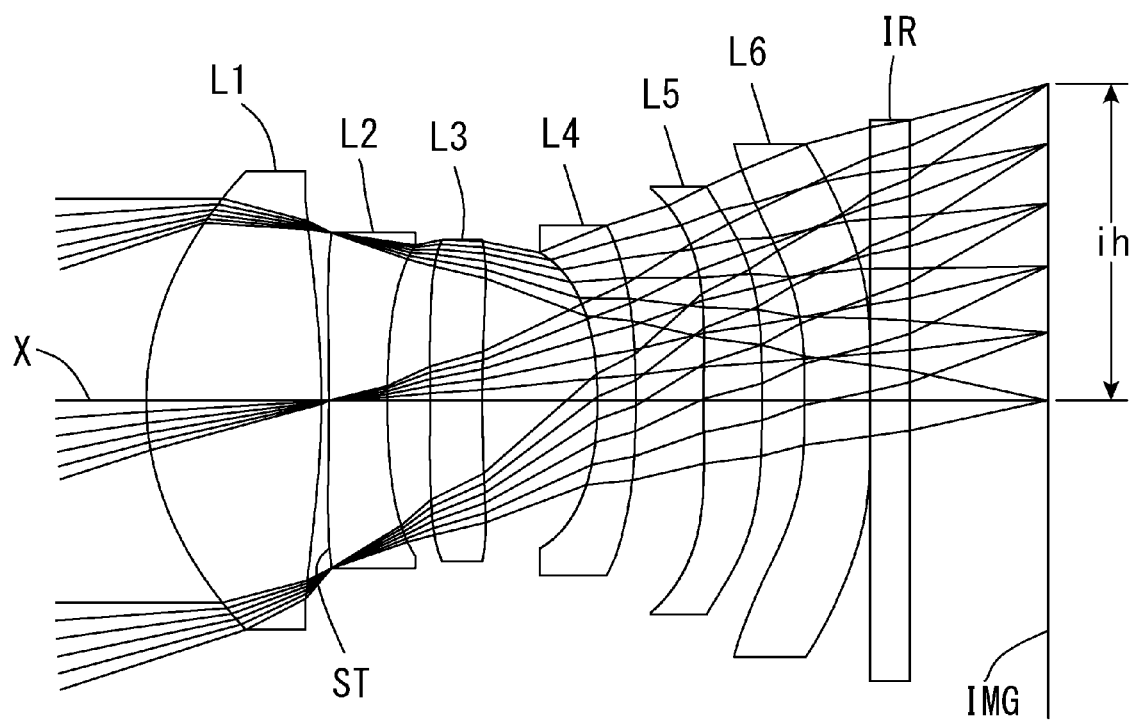
FIG. 11 is a schematic view showing the general configuration of an imaging lens in Example 6 according to the present invention.

FIG. 10 shows spherical aberration (mm), astigmatism (mm), and distortion (%) of the imaging lens in Example 5.

As shown in FIG. 10, each aberration is corrected excellently.

EXAMPLE 6

The basic lens data is shown below in Table 6.

TABLE 6

| Example6 |
|---|

| Unit mm |
|---|

| f = 4.96 | | | ih = 1.66 | |
|---|---|---|---|---|
| Fno = 2.3 | | | TTL = 4.64 | |
| ω(°) = 18.0 | | | | |

| Surface Data | | | | |
|---|---|---|---|---|
| Surface Number i | Curvature Radius r | Surface Distance d | Refractive Index Nd | Abbe Number νd |
| (Object) | Infinity | Infinity | | |
| 1* | 1.5030 | 0.9151 | 1.544 | 55.86 (vd1) |
| 2* | −4.5546 | 0.0400 | | |
| 3* (Stop) | −12.6914 | 0.3041 | 1.661 | 20.37 (vd2) |
| 4* | 4.7341 | 0.2239 | | |
| 5* | −39.5113 | 0.2724 | 1.535 | 55.66 |
| 6* | 7.6098 | 0.6010 | | |
| 7* | −2.3450 | 0.2000 | 1.544 | 55.86 (vd4) |
| 8* | −10.0664 | 0.3556 | | |
| 9* | 20.0471 | 0.3060 | 1.661 | 20.37 (vd5) |
| 10* | −8.2068 | 0.2217 | | |
| 11* | −8.0146 | 0.3387 | 1.661 | 20.37 |
| 12* | 10.1383 | 0.3000 | | |
| 13 | Infinity | 0.2100 | 1.517 | 64.17 |
| 14 | Infinity | 0.4252 | | |
| Image Plane | Infinity | | | |

| Constituent Lens Data | | | |
|---|---|---|---|
| Lens | Start Surface | Focal Length | |
| 1 | 1 | 2.19 | bf = 0.86 |
| 2 | 3 | −5.18 | |
| 3 | 5 | −11.91 | ph = 0.25 |
| 4 | 7 | −5.67 | |
| 5 | 9 | 8.85 | EPsd = 1.06 |
| 6 | 11 | −6.72 | |

| Aspheric Surface Data | | | | | | |
|---|---|---|---|---|---|---|
| | First Surface | Second Surface | Third Surface | Fourth Surface | Fifth Surface | Sixth Surface |
| k | −1.270109E−00 | −8.213839E−02 | 0.000000E+00 | 3.860805E+00 | 0.000000E+00 | 0.000000E+00 |
| A4 | 3.234044E−02 | −2.663315E−02 | 1.247026E−01 | 1.142690E−01 | 9.281122E−02 | −4.788385E−02 |
| A6 | 6.090247E−03 | 3.393665E−01 | 3.539479E−01 | 9.892606E−02 | 3.687457E−02 | 1.168039E−02 |
| A8 | −1.740351E−02 | −9.136012E−01 | −9.228962E−01 | −2.809233E−02 | 1.748282E−02 | −9.995571E−02 |
| A10 | 2.209602E−02 | 1.406013E+00 | 1.279474E+00 | −6.448480E−01 | −7.505337E−02 | 1.305287E−02 |
| A12 | −1.992562E−02 | −1.265039E+00 | −8.696693E−01 | 2.284565E+00 | 1.692729E−01 | −3.501296E−02 |
| A14 | 8.725961E−03 | 6.196460E−01 | 1.798612E−01 | −3.016650E+00 | 0.000000E+00 | 0.000000E+00 |
| A16 | −1.116944E−03 | −1.273519E−01 | 4.331572E−02 | 1.572792E+00 | 0.000000E+00 | 0.000000E+00 |
| | Seventh Surface | Eighth Surface | Ninth Surface | Tenth Surface | Eleventh Surface | Twelfth Surface |
| k | 6.600927E−00 | 9.899756E+01 | 0.000000E+00 | 4.182418E+01 | 8.042867E+00 | 4.705091E+01 |
| A4 | −3.984977E−01 | −3.705253E−01 | −1.113174E−01 | −1.024633E−01 | −4.557467E−01 | −4.393905E−01 |
| A6 | 4.622521E−01 | 5.227460E−01 | −3.738109E−01 | −2.906657E−01 | 2.712071E−01 | 3.635209E−01 |
| A8 | −2.932797E−01 | −8.194119E−02 | 7.830376E−01 | 4.935314E−01 | 1.175970E−01 | −1.711688E−01 |
| A10 | −2.096377E−01 | −4.891348E−01 | −9.484277E−01 | −3.996107E−01 | −1.492934E−01 | 4.450149E−02 |
| A12 | −4.532872E−01 | 2.951865E−01 | 6.190533E−01 | 1.964607E−01 | 3.629024E−02 | −5.913097E−03 |
| A14 | 0.000000E−00 | 0.000000E+00 | −1.665159E−01 | −4.045901E−02 | 0.000000E+00 | 0.000000E+00 |
| A16 | 0.000000E−00 | 0.000000E+00 | 0.000000E+00 | 0.000000E+00 | 0.000000E+00 | 0.000000E+00 |

The imaging lens in Example 6 satisfies conditional expressions (1) to (17), and (a) to (c) as shown in Table 8.

Figure 12:
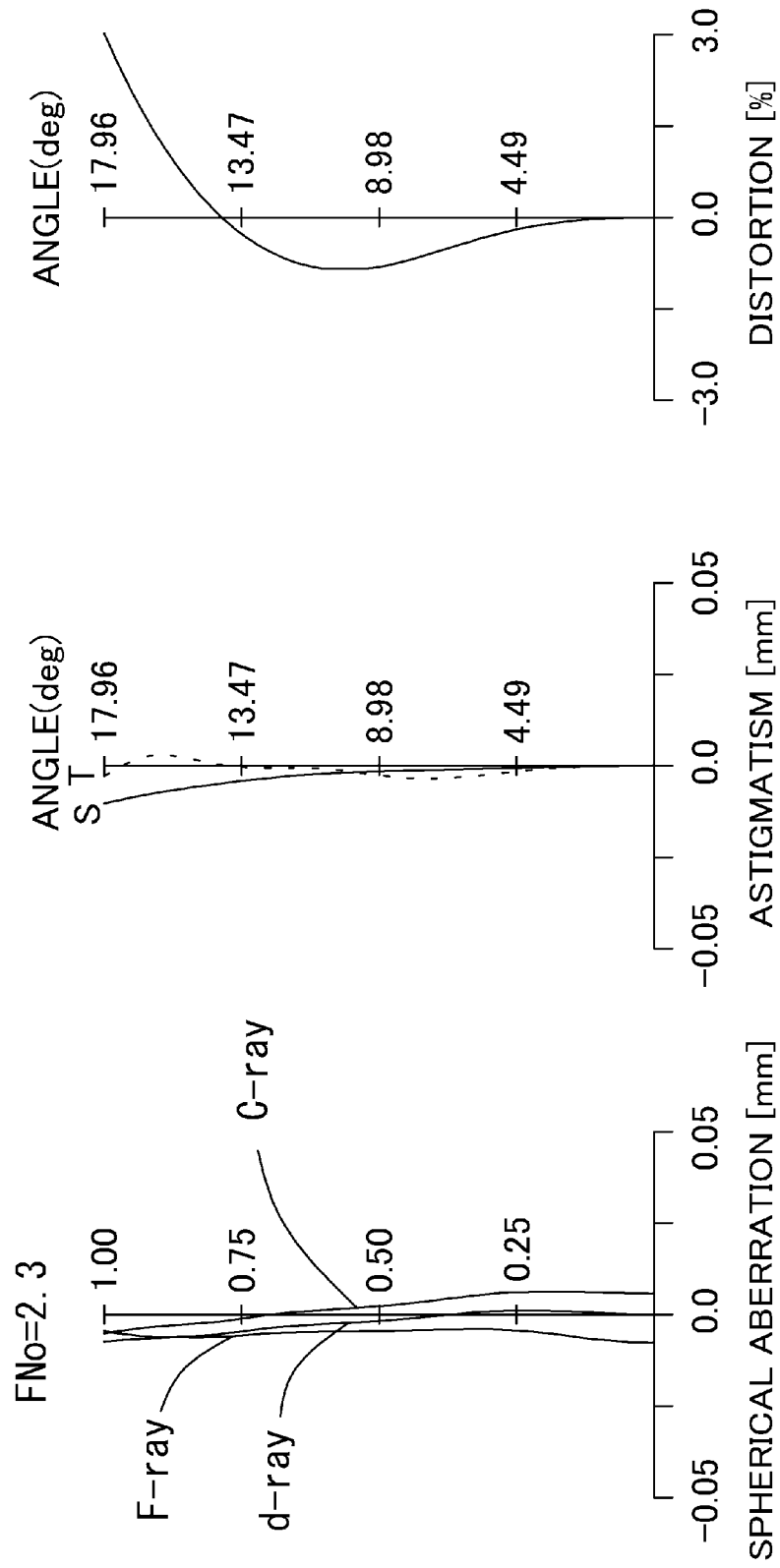
FIG. 12 shows spherical aberration, astigmatism, and distortion of the imaging lens in Example 6 according to the present invention.
Figure 13:
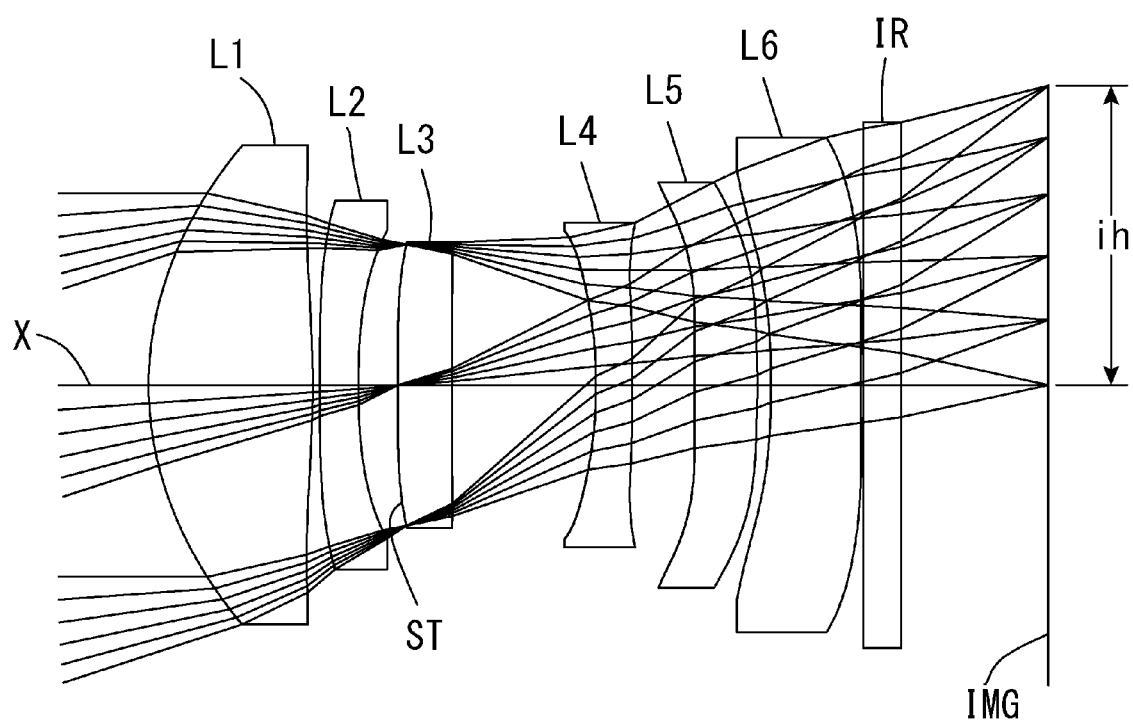
FIG. 13 is a schematic view showing the general configuration of an imaging lens in Example 7 according to the present invention.

FIG. 12 shows spherical aberration (mm), astigmatism (mm), and distortion (%) of the imaging lens in Example 6.

As shown in FIG. 12, each aberration is corrected excellently.

EXAMPLE 7

The basic lens data is shown below in Table 7.

TABLE 7

Example7

Unit mm f = 4.95  
Fno = 2.3  
ω(°) = 18.0  
ih = 1.66  
TTL = 4.87

Surface Data

| Surface Number i | Curvature Radius r | Surface Distance d | Refractive Index Nd | Abbe Number νd |
|---|---|---|---|---|
| (Object) | Infinity | Infinity | | |
| 1* | 1.8169 | 0.9084 | 1.583 | 59.46 (vd1) |
| 2* | −5.9914 | 0.0400 | | |
| 3* | 132.2669 | 0.2109 | 1.661 | 20.37 (vd2) |
| 4* | 3.7845 | 0.2217 | | |
| 5* (Stop) | Infinity | 0.2958 | 1.535 | 55.66 |
| 6* | Infinity | 0.7868 | | |
| 7* | −2.9468 | 0.2000 | 1.544 | 55.86 (vd4) |
| 8* | −24.6763 | 0.3453 | | |
| 9* | 15.5052 | 0.3414 | 1.661 | 20.37 (vd5) |
| 10* | −10.7141 | 0.0987 | | |
| 11* | −5.5636 | 0.4791 | 1.535 | 55.66 |
| 12* | 10.9559 | 0.2000 | | |
| 13 | Infinity | 0.2100 | 1.517 | 64.17 |
| 14 | Infinity | 0.5981 | | |
| Image Plane | Infinity | | | |

Constituent Lens Data

| Lens | Start Surface | Focal Length | |
|---|---|---|---|
| 1 | 1 | 2.50 | bf = 0.94 |
| 2 | 3 | −5.90 | |
| 3 | 5 | Infinity | ph = 0.37 |
| 4 | 7 | −6.17 | |
| 5 | 9 | 9.64 | EPsd = 1.06 |
| 6 | 11 | −6.83 | |

Aspheric Surface Data

| | First Surface | Second Surface | Third Surface | Fourth Surface | Fifth Surface | Sixth Surface |
|---|---|---|---|---|---|---|
| k | −1.580809E+00 | −1.514710E−01 | 0.000000E+00 | −4.282786E+00 | 0.000000E+00 | 0.000000E+00 |
| A4 | 2.318605E−02 | 8.066842E−02 | 1.106719E−01 | 1.023867E−01 | 1.070536E−01 | 8.562714E−03 |
| A6 | 8.951228E−04 | −1.190811E−01 | −1.057177E−01 | 3.609357E−02 | 7.489022E−02 | 5.360273E−02 |
| A8 | −6.943691E−03 | 2.081644E−01 | 2.165986E−01 | 9.104809E−02 | −1.357247E−04 | −1.123909E−01 |
| A10 | 8.369921E−03 | −2.384250E−01 | −2.663766E−01 | −1.305903E−01 | −1.540426E−01 | 1.385903E−02 |
| A12 | −5.031643E−03 | 1.622594E−01 | 1.188936E−01 | −1.638871E−01 | 7.238718E−02 | −2.551083E−02 |
| A14 | 1.793480E−03 | −5.903662E−02 | 2.231758E−02 | 2.760247E−01 | 0.000000E+00 | 0.000000E+00 |
| A16 | −3.128712E−04 | 8.857930E−03 | −2.081947E−02 | −5.779381E−02 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 8.306315E+00 | 9.899756E+01 | 0.000000E+00 | 7.603025E+01 | 8.042867E100 | 5.028658E+01 |
| A4 | −1.650695E−01 | −2.311710E−01 | −1.526578E−01 | −4.762353E−02 | −1.593132E−01 | −1.989537E−01 |
| A6 | 5.428604E−01 | 5.612399E−01 | −3.267509E−01 | −3.477710E−01 | 8.825450E−02 | 1.671973E−01 |
| A8 | −2.669616E−01 | −5.932410E−04 | 8.172787E−01 | 5.868632E−01 | 6.842236E−02 | −1.043353E−01 |
| A10 | −4.129564E−01 | −5.808236E−01 | −9.770930E−01 | −4.746533E−01 | −6.301601E−02 | 3.606948E−02 |
| A12 | 2.428036E−01 | 3.134244E−01 | 6.100266E−01 | 2.008107E−01 | 1.283445E−02 | −5.975785E−03 |
| A14 | 0.000000E+00 | 0.000000E+00 | −1.472357E−01 | −3.183276E−02 | 0.000000E+00 | 0.000000E+00 |
| A16 | 0.000000E+00 | 0.000000E+00 | 0.000000E+00 | 0.000000E+00 | 0.000000E+00 | 0.000000E+00 |

The imaging lens in Example 7 satisfies conditional expressions (1) to (17), and (a) to (c) as shown in Table 8.

Figure 14:
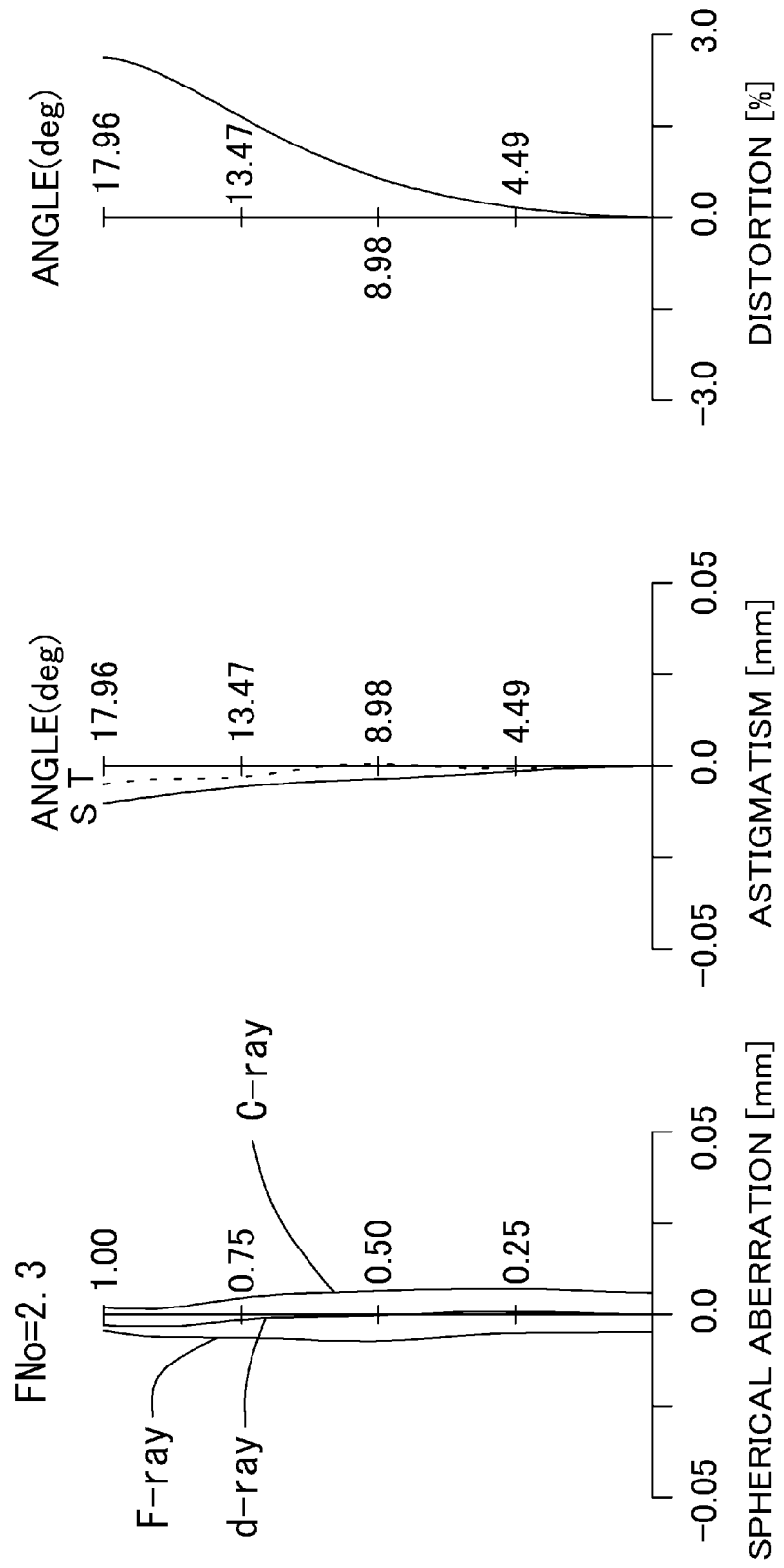
FIG. 14 shows spherical aberration, astigmatism, and distortion of the imaging lens in Example 7 according to the present invention.

FIG. 14 shows spherical aberration (mm), astigmatism (mm), and distortion (%) of the imaging lens in Example 7. As shown in FIG. 14, each aberration is corrected excellently.

In table 8, values of conditional expressions (1) to (17), and (a) to (c) related to the Examples 1 to 7 are shown.

TABLE 8

| | Example1 | Example2 | Example3 | Example4 | Example5 | Example6 | Example7 |
|---|---|---|---|---|---|---|---|
| Conditional Expression (1) TTL/f | 0.98 | 0.98 | 0.98 | 0.94 | 0.94 | 0.94 | 0.98 |
| Conditional Expression (2) \|r11\|/f | 1.09 | 1.04 | 1.04 | 1.41 | 1.30 | 1.61 | 1.12 |
| Conditional Expression (3) (t3/f) × 100 | 16.68 | 15.47 | 15.10 | 13.18 | 15.07 | 12.11 | 15.89 |
| Conditional Expression (4) r7/r8 | 0.12 | 0.08 | 0.08 | 0.02 | 0.02 | 0.23 | 0.12 |
| Conditional Expression (5) \|r3\|/f | 26.71 | 26.71 | 26.72 | 2.66 | 3.69 | 2.56 | 26.72 |
| Conditional Expression (6) f6/f | −1.33 | −1.29 | −1.29 | −1.57 | −1.49 | −1.35 | −1.38 |
| Conditional Expression (7) t3/t4 | 2.62 | 2.44 | 2.39 | 1.89 | 2.46 | 1.69 | 2.28 |
| Conditional Expression (8) ν1-ν2 | 35.50 | 35.50 | 35.50 | 35.50 | 35.50 | 35.50 | 39.10 |
| Conditional Expression (9) (EPsd × TTL)/(ih × f) | 0.63 | 0.63 | 0.63 | 0.60 | 0.60 | 0.60 | 0.63 |
| Conditional Expression (10) \|r9\|/f | 3.77 | 2.97 | 2.80 | 2.77 | 5.35 | 4.04 | 3.13 |
| Conditional Expression (11) f1/f | 0.50 | 0.50 | 0.49 | 0.46 | 0.45 | 0.44 | 0.50 |
| Conditional Expression (12) f2/f | −1.13 | −1.13 | −1.13 | −0.93 | −0.76 | −1.04 | −1.19 |
| Conditional Expression (13) d1/f | 0.19 | 0.19 | 0.18 | 0.18 | 0.20 | 0.18 | 0.18 |
| Conditional Expression (14) f4/f | −1.29 | −1.23 | −1.21 | −1.08 | −1.27 | −1.14 | −1.25 |
| Conditional Expression (15) bf/TTL | 0.19 | 0.20 | 0.20 | 0.19 | 0.18 | 0.19 | 0.19 |
| Conditional Expression (16) ν4-ν5 | 35.50 | 35.50 | 35.50 | 35.50 | 35.50 | 35.50 | 35.50 |
| Conditional Expression (17) f4/f6 | 0.97 | 0.95 | 0.94 | 0.69 | 0.85 | 0.84 | 0.90 |
| Conditional Expression (a) f/f3 | 0.00 (infinity) | 0.02 | 0.00 | −0.14 | −0.03 | −0.42 | 0.00 (infinity) |
| Conditional Expression (b) f5/f | 2.09 | 1.89 | 1.84 | 1.67 | 2.03 | 1.78 | 1.95 |
| Conditional Expression (c) ph/ih | 0.21 | 0.22 | 0.23 | 0.17 | 0.17 | 0.15 | 0.22 |

When the imaging lens according to the present invention is applied to products having camera function, contribution to reducing size of the camera, the low-profileness and telephoto ratio, and high performance thereof can be achieved.

DESCRIPTION OF REFERENCE NUMERALS

ST: aperture stop,
L1: first lens,
L2: second lens,
L3: third lens,
L4: fourth lens,
L5: fifth lens,
L6: sixth lens,
IMG: image plane,
IR: filter, and
ih: maximum image height.

What is claimed is:

1. An imaging lens comprising in order from an object side to an image side,
a first lens having positive refractive power,
a second lens,
a third lens,
a fourth lens having negative refractive power and a concave surface facing the object side near an optical axis,
a fifth lens having the positive refractive power, and
a sixth lens having a concave surface facing the object side near the optical axis, wherein below conditional expressions (2), (11) and (16) are satisfied:

$$0.7 < |r11|/f < 2.0 \quad (2)$$

$$0.2 < f1/f < 0.8 \quad (11)$$

$$20 < \nu d4 - \nu 5 < 50 \quad (16)$$

where
f: focal length of the overall optical system,
r11: curvature radius of the object-side surface of the sixth lens L6, f1: focal length of the first lens,
vd4: abbe number at d-ray of a fourth lens, and
vd5: abbe number at d-ray of a fifth lens.

2. An imaging lens comprising in order from an object side to an image side,
a first lens having convex surfaces facing the object side and the image side and positive refractive power,
a second lens,
a third lens,
a fourth lens,
a fifth lens having convex surfaces facing the object side and the image side and the positive refractive power, and
a sixth lens having a concave surface facing the object side near the optical axis, wherein below conditional expressions (3), (7) and (8) are satisfied:

$$10 < (t3/f) \times 100 < 20 \qquad (3)$$

$$1.0 < t3/t4 < 3.2 \qquad (7)$$

$$20 < vd1 - vd2 < 50 \qquad (8)$$

where
f: focal length of the overall optical system,
t3: distance along the optical axis from the image-side surface of the third lens to the object-side surface of the fourth lens,
t4: distance along the optical axis from the image-side surface of the fourth lens to the object-side surface of the fifth lens,
vd1: abbe number at d-ray of a first lens,
vd2: abbe number at d-ray of a second lens.

3. An imaging lens according to claim 1, wherein said fourth lens has a convex image-side surface near the optical axis and a below conditional expression (4) is satisfied:

$$0 < r7/r8 < 0.4 \qquad (4)$$

where
r7: curvature radius of the object-side surface of the fourth lens, and
r8: curvature radius of the image-side surface of the fourth lens.

4. An imaging lens according to claim 1, wherein a below conditional expression (5) is satisfied:

$$1.5 < |r3|/f < 32.0 \qquad (5)$$

where
r3: curvature radius of the object-side surface of the second lens.

5. An imaging lens according to claim 1, wherein a below conditional expression (6) is satisfied:

$$-2.0 < f6/f < -1.0 \qquad (6)$$

where
f6: focal length of the sixth lens.

6. An imaging lens according to claim 1, wherein a below conditional expression (7) is satisfied:

$$1.0 < t3/t4 < 3.2 \qquad (7)$$

where
t3: distance along the optical axis from the image-side surface of the third lens to the object-side surface of the fourth lens, and
t4: distance along the optical axis from the image-side surface of the fourth lens to the object-side surface of the fifth lens.

7. An imaging lens according to claim 1, wherein a below conditional expression (8) is satisfied:

$$20 < vd1 - vd2 < 50 \qquad (8)$$

where
vd1: abbe number at d-ray of a first lens, and
vd2: abbe number at d-ray of a second lens.

8. An imaging lens according to claim 1, wherein a below conditional expression (9) is satisfied:

$$0.45 < (EPsd \times TTL)/(ih \times f) < 0.75 \qquad (9)$$

where
EPsd: entrance pupil radius, and
Ih: maximum image height.

9. An imaging lens according to claim 1, wherein a below conditional expression (10) is satisfied:

$$2.0 < |r9|/f < 7.0 \qquad (10)$$

where
r9: curvature radius of the object-side surface of the fifth lens.

10. An imaging lens according to claim 1, wherein said second lens has a concave image-side surface near the optical axis and a below conditional expression (12) is satisfied:

$$-1.5 < f2/f < -0.4 \qquad (12)$$

where
f2: focal length of the first lens.

11. An imaging lens according to claim 1, wherein a below conditional expression (13) is satisfied:

$$0.15 < d1/f < 0.25 \qquad (13)$$

where
d1: thickness on the optical axis of the first lens.

12. An imaging lens according to claim 1, wherein a below conditional expression (14) is satisfied:

$$-1.7 < f4/f < -0.6 \qquad (14)$$

where
f4: focal length of the fourth lens.

13. An imaging lens according to claim 1, wherein a below conditional expression (15) is satisfied:

$$0.15 < bf/TTL < 0.25 \qquad (15)$$

where
bf: distance along the optical axis from the image-side surface of the sixth lens to an image plane.

14. An imaging lens according to claim 2, wherein said fourth lens has a convex image-side surface near the optical axis and a below conditional expression (4) is satisfied:

$$0 < r7/r8 < 0.4 \qquad (4)$$

where
r7: curvature radius of the object-side surface of the fourth lens, and
r8: curvature radius of the image-side surface of the fourth lens.

15. An imaging lens according to claim 2, wherein a below conditional expression (5) is satisfied:

$$1.5 < |r3|/f < 32.0 \qquad (5)$$

where
r3: curvature radius of the object-side surface of the second lens.

16. An imaging lens according to claim 2, wherein a below conditional expression (6) is satisfied:

$$-2.0 < f6/f < -1.0 \qquad (6)$$

where
f6: focal length of the sixth lens.

17. An imaging lens according to claim 2, wherein a below conditional expression (9) is satisfied:

$$0.45 < (EPsd \times TTL)/(ih \times f) < 0.75 \quad (9)$$

where
EPsd: entrance pupil radius, and
Ih: maximum image height.

18. An imaging lens according to claim 1, wherein a below conditional expression (1) is satisfied:

$$0.6 < TTL/f < 1.0 \quad (1)$$

where
TTL: total track length.

19. An imaging lens according to claim 2, wherein a below conditional expression (1) is satisfied:

$$0.6 < TTL/f < 1.0 \quad (1)$$

where
TTL: total track length.

* * * * *